United States Patent
Scharmann et al.

(10) Patent No.: US 9,864,766 B2
(45) Date of Patent: Jan. 9, 2018

(54) METHODS AND SYSTEMS FOR UPDATING A DIGITAL MAP

(71) Applicant: TomTom Germany GmbH & Co. KG, Harsum (DE)

(72) Inventors: Hannes Scharmann, Hildesheim (DE); Hans-Ulrich Otto, Hildesheim (DE); Volker Hiestermann, Laatzen (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 263 days.

(21) Appl. No.: 14/394,131

(22) PCT Filed: Apr. 9, 2013

(86) PCT No.: PCT/EP2013/057387
§ 371 (c)(1),
(2) Date: Oct. 13, 2014

(87) PCT Pub. No.: WO2013/153062
PCT Pub. Date: Oct. 17, 2013

(65) Prior Publication Data
US 2015/0058305 A1  Feb. 26, 2015

(30) Foreign Application Priority Data

Apr. 13, 2012  (GB) .................................. 1206578.5
Feb. 4, 2013  (GB) .................................. 1301926.0

(51) Int. Cl.
*G06F 17/30* (2006.01)
*G01C 21/32* (2006.01)
*G09B 29/10* (2006.01)

(52) U.S. Cl.
CPC ....... *G06F 17/30309* (2013.01); *G01C 21/32* (2013.01); *G06F 17/30241* (2013.01); *G09B 29/106* (2013.01)

(58) Field of Classification Search
USPC .................................................. 707/687, 695
See application file for complete search history.

(56) References Cited

U.S. PATENT DOCUMENTS 5,163,148 A * 11/1992 Walls ................. G06F 11/1466
707/695
5,386,559 A *  1/1995 Eisenberg ......... G06F 17/30309
707/695

(Continued)

FOREIGN PATENT DOCUMENTS

CN  101029830 A  9/2007
CN  101438231 A  5/2009

(Continued)

OTHER PUBLICATIONS

XP007901268—Flament M, "Results of Implementation and Validation of the ACTMAP Incremental Map Updates for Advanced in-Vehicle Applications", Internet Citation, Jun. 2005 (Jun. 2005) ,Retrieved from the Internet : URL:http ://www.ertico.com/download/actmap_public_documents/2005-06%20ActMAP_implementation&validationITSinEurope.pdf [retrieved on Nov. 2, 2006].

(Continued)

*Primary Examiner* — Kim Nguyen

(57) ABSTRACT

A system and method are disclosed for incrementally updating an existing digital map of a client device in a digital map update system. The digital map update system comprises, for each of one or more baseline digital maps, at least one digital map update repository comprising data which may be communicated to one or more remote client devices for use by the or each remote client device in incrementally updating an existing digital map of the device. Each repository includes one or more digital map forward update journals in respect of a respective given version of the baseline map to which the digital map update repository relates. The forward update journal comprises data indicative of a set of one or (Continued)

more incremental updates that may be used to update the given version of the baseline map to a later version. Each repository also includes one or more digital map reverse update journals for reversing the effects of the or a forward update journal and reverting the later version of the baseline map back to an earlier version.

15 Claims, 4 Drawing Sheets

(56) References Cited

U.S. PATENT DOCUMENTS

| | | | | |
|---|---|---|---|---|
| 5,684,989 | A * | 11/1997 | Nissato | G06F 17/30309 707/695 |
| 6,035,297 | A * | 3/2000 | Van Huben | G06F 17/30557 707/695 |
| 6,151,608 | A * | 11/2000 | Abrams | G06F 17/303 707/679 |
| 6,230,098 | B1 * | 5/2001 | Ando | G01C 21/32 340/990 |
| 6,711,572 | B2 * | 3/2004 | Zakharov | G06F 17/30144 707/655 |
| 6,886,018 | B1 * | 4/2005 | Boudris | G06F 17/30569 707/625 |
| 7,680,593 | B2 * | 3/2010 | Fujimoto | G01C 21/32 701/451 |
| 8,489,332 | B2 * | 7/2013 | Tomobe | G01C 21/32 701/410 |
| 2002/0174360 | A1 | 11/2002 | Ikeda | |
| 2007/0126605 | A1 | 6/2007 | Aleksic et al. | |
| 2007/0208505 | A1 | 9/2007 | Fujimoto | |
| 2007/0260628 | A1 | 11/2007 | Fuchs et al. | |
| 2008/0249705 | A1 | 10/2008 | Mtsuda | |
| 2009/0164110 | A1 | 6/2009 | Basir | |
| 2009/0187336 | A1 | 7/2009 | Kawamata et al. | |
| 2010/0106397 | A1 | 4/2010 | van Essen | |
| 2011/0087429 | A1 | 4/2011 | Trum | |
| 2011/0137546 | A1 | 6/2011 | Roesser et al. | |
| 2012/0066231 | A1 | 3/2012 | Petersen | |

FOREIGN PATENT DOCUMENTS

| | | |
|---|---|---|
| CN | 101669156 A | 3/2010 |
| CN | 101726309 A | 6/2010 |
| CN | 101957209 A | 1/2011 |
| EP | 1929243 A1 | 6/2008 |
| JP | 2005164945 A | 6/2005 |
| JP | 2006126683 A | 5/2006 |
| JP | 2007233209 A | 9/2007 |
| JP | 2007256959 A | 10/2007 |
| JP | 2011197560 A | 10/2011 |
| WO | 2008108043 A1 | 9/2008 |

OTHER PUBLICATIONS

International Search Report issued Jun. 21, 2013 for International Patent Application No. PCT/EP2013/054916.
XP007901290—ACTMAP: "Information Sociert Technologies. Actual and dynamic Map for transport telematic applications (Project No IST-2001-34141; Deliverable No. D 3.3—ActMAP ISO Input", Internet Citation, Nov. 12, 2004. Retrieved from Internet: URL: http://www.ertico.com/download/actmap_public_documents/119v10-D33-ActMAP-ISO%20Input.pdf [retrieved on Nov. 1, 2006] sections 7 and C.3; figures 27, 40
XP055113080—Kyoungwook Min et al: "A System Framework for Map Air Update Navigation Service", ETRI Journal, vol. 33, No. 4, pp. 476-486, ISSN: 1225-6463, DOI: 10.4218/etrij.11.1610.0012 section IV.
International Search Report dated Apr. 23, 2014 for International Patent Application No. PCT/EP2013/057388.
International Search Report dated Apr. 23, 2014 for International Patent Application No. PCT/EP2013/057387.

* cited by examiner

METHODS AND SYSTEMS FOR UPDATING A DIGITAL MAP

CROSS-REFERENCES TO RELATED APPLICATIONS

This application is the National Stage of International Application No. PCT/EP2013/057387, filed Apr. 9, 2013 and designating the United States. The application claims priority from United Kingdom Patent Application No. 1206578.5 filed Apr. 13, 2012 and United Kingdom Patent Application No. 1301926.0 filed Feb. 4, 2013. The entire content of both these applications is incorporated herein by reference.

FIELD OF THE INVENTION

The present invention relates to digital map update systems for incrementally updating an existing digital map of a remote client device or devices, and to methods of providing digital map update data to one or more remote client devices for use by the device(s) in incrementally updating an existing digital map of the or each remote client device.

BACKGROUND TO THE INVENTION

In a navigation system, it is useful to be able to update the digital map of a client device remotely using a digital map update server. For example, the client device might be a portable navigation device (PND) or other navigation device associated with a user, or could be a client server. One known technique for updating such a map involves the client device periodically downloading a complete new version of a digital map from the update server to replace a previous version of the map held by the client device. The new version of the digital map will incorporate any updates, e.g. corrections or enhancements, since the previous version of the digital map held by the client device. For example, traditionally a navigation map provider would release a new version of a digital map, e.g. quarterly, incorporating any updates since the previous version of the map, which could be downloaded by client devices.

However, more recently it has been recognised that, rather than periodically replacing the entire digital map of a client device in order to update the map, it is desirable to instead be able to only update those parts of the digital map which have changed. These arrangements are advantageous in that only updates, i.e. changes to the digital map, since it was previously updated for example, need be transmitted to the client device. The updates can be received by the client device and used to update the existing map of the device. Systems in which only updates, i.e. changes to the digital map, are provided to the client device, and used to update an existing digital map of the device, may be referred to as "incremental update" systems. Such incremental update systems provide greater flexibility, and enable the digital map of the client device to be kept more regularly updated, rather than being limited to periodic updating when a new version of the map is released. For example, the digital map may be updated once a week, or once a day, or at any desired interval. Furthermore, incremental update systems are less demanding in terms of processing power and/or memory of the client devices, enabling updates to be implemented more easily, e.g. on the fly. There are, however, certain challenges in implementing incremental update systems for updating the digital map of a remote client device.

Certain particular difficulties revolve around ensuring consistency and quality of the digital maps of client devices in an incremental update system.

The Applicant has realised that there remains scope for improvement in systems and methods for providing incremental update data for use in updating an existing digital map of a remote client device.

SUMMARY OF THE INVENTION

In accordance with a first aspect of the invention there is provided a digital map update system, comprising, for each of one or more baseline digital maps, at least one digital map update repository comprising data which may be communicated to one or more remote client devices for use by the or each remote client device in incrementally updating an existing digital map of the device, wherein the or each digital map update repository comprises one or more digital map update journals, each digital map update journal being in respect of a given version of the baseline map to which the digital map update repository relates, wherein each digital map update journal comprises, for a respective given version of the baseline digital map, data indicative of a set of one or more incremental updates that may be used to update the given version of the baseline map to another version.

In accordance with the invention, therefore, the digital map update system comprises at least one digital map update repository in respect of each of one or more different baseline digital maps. Each digital map update repository includes one or more digital map update journals for the given baseline map. Each digital map update journal comprises data indicative of a set of one or more updates that may be used together with data indicative of a given version of the baseline map to update the baseline map from the given version to another version. The another version may be, and preferably is, a successive version, i.e. a consecutive earlier or later version. In this way, data from one or more digital map update repository may be communicated to one or more remote client device having an existing digital map that is a version of the baseline digital map to which the repository relates to update the existing digital map of the device to another version.

By providing a digital map data repository system having an update repository in respect of one or more baseline digital maps in this way, with each repository having one or more update journals comprising incremental update data for updating the baseline map from one version to another, more consistent and uniform incremental updating of the existing digital maps of client devices may be obtained, by providing data from the relevant journal or journals required to update the map through a given number of versions from the repository in respect of the baseline map that corresponds to the existing digital map of a device. As each digital map update repository is specific to a particular baseline map, and update data is organised in journals in respect of particular versions of the map, it may be ensured that the incremental update data that is provided to a client device will result in a consistent digital map when used to update the existing digital map of the device. In some preferred embodiments as discussed below, a plurality of digital map update repositories may be provided in respect of each baseline map, each repository comprising one or more digital map update journals for updating the digital map in accordance with a different update profile.

The system may comprise processing means for carrying out any of the steps described. For example the system may comprise a set of one or more processors configured, e.g.

programmed, for doing so. A given step may be carried out using the same or a different set of processors to any other step. Any given step may be carried out using a combination of sets of processors.

Each digital map update journal of a given digital map update repository comprises data, in respect of a given versions of the baseline digital map, that may be used to incrementally update the version of the map to another version, i.e. a later or earlier version.

The journal may be provided by any suitable arrangement that may provide this function. It will be appreciated that the data of a "journal" may be provided in a single location, or may be distributed over multiple locations, provided that it is associated together such that the specified sets of incremental update data may be identified. Furthermore, a given journal may or may not be distinct from any other journal, provided that the data of the journal is somehow associated together. A given journal may comprise one or more databases storing the incremental update data for updating a given version of the baseline digital map. The set of incremental updates of a given update journal is a set of incremental updates that, together with digital map data in respect of a given version of the baseline digital map, can be used to provide an updated version of the digital map. The incremental updates may be all possible incremental updates, or a subset thereof, in embodiments in which a digital map repository, and hence journal, is for updating a digital map in accordance with a particular update profile. A journal may be associated with data indicative of the baseline map, and the given version of the baseline map, to which it relates. A digital map update repository may be associated with data indicative of the baseline map to which it relates.

In accordance with the invention in any of its aspects or embodiments, the "baseline digital map" refers to a particular digital map product. The baseline digital map is used by one or more, or preferably a plurality of client devices. A digital map update repository for the baseline map provides incremental update data which may be used by client devices to incrementally update an existing digital map, i.e. in accordance with a version of the baseline digital map, from a given version to another version or versions in the forward and/or reverse directions. The baseline map undergoes various updates over time, resulting in different versions of the map. Each version is a result of applying incremental changes to an earlier version. Although the incremental changes result in a new version of the map, the map is considered to be a version of the same baseline map. A "version" of the baseline digital map is an edition of the map.

A "version" of the baseline digital map as used herein refers to a predetermined version of the map. The point at which an updated version of a baseline map is considered to constitute a new version of the map may be set as desired e.g. by a digital map data provider. The versions of the baseline digital map are in respect of different times. The times may be selected as desired, and may be at regular or irregular intervals. For example, a version of the baseline digital map may be created at predetermined regular intervals, e.g. each day or week. In other arrangements, a version of the digital map may only be created when a given number of incremental updates has been received. The versions may then be created at irregular intervals. A set of incremental updates of a given digital map update journal for updating the baseline map from a given version to another later version will comprise a set of incremental updates which is necessary to modify the digital map data in respect of the given version to provide the digital map data in respect of the later version. Similarly, a set of incremental updates of a given digital map update journal for updating the baseline map from a given version to another earlier version will comprise a set of incremental updates which is necessary to modify the digital map data in respect of the given version to provide the digital map data in respect of the earlier version.

In accordance with the invention in any of its aspects or embodiments, the one or more digital map update journals of a given digital map update repository may comprise one or more, and preferably a plurality of, forward update journals and/or one or more, and preferably a plurality of, reverse update journals. Preferably at least one or more, or a plurality of, digital map forward update journals are provided. A forward update journal comprises, in respect of a given version of the baseline digital map, data indicative of a set of one or more incremental updates that may be used together with digital map data indicative of the given version of the baseline map to update the given version of the baseline map to another later version. A reverse update journal comprises, in respect of a given version of the baseline digital map, data indicative of a set of one or more incremental updates that may be used together with digital map data indicative of the given version of the baseline map to update the given version of the baseline map to another earlier version.

In some embodiments, the or each digital map update repository comprises one or more, and preferably a plurality of, digital map forward update journals, each digital map forward update journal comprising, for a given version of the baseline digital map, data indicative of a set of one or more incremental updates that may be used to update the given version of the baseline map to another later version. In these embodiments the plurality of digital map forward update journals are in respect of different given versions of the baseline map, each digital map update journal comprising data that may be used to update the baseline map from the given version to a later version. The forward update journals are preferably in respect of successive versions of the baseline map. References herein to versions of the map being successive versions refer to the versions being consecutive earlier or later versions. Preferably the plurality of different given versions of the baseline map are successive versions of the baseline map, wherein the digital map update journals each respectively comprise data that may be used to update the baseline map from a given version to a next later version of the plurality of successive versions of the baseline map. In these preferred embodiments in which multiple digital map forward update journals are provided, the digital map update repository may be used to update existing digital maps of different client devices that correspond to different given versions of the baseline map to a newer version and/or to update an existing digital map of a client device to a newer version that is more than one version newer than the existing digital map of the device.

In particularly preferred embodiments, the or each digital map update repository comprises one or more digital map reverse update journals for the baseline map to which the digital map data repository relates, wherein each digital map reverse update journal comprises, for a given version of the baseline map, data indicative of a set of one or more incremental updates that may be used to update the baseline map from the given version to another earlier version. The earlier version may be, and preferably is, a successive earlier version. Preferably the or each digital map update repository comprises the one or more, or preferably a plurality of, digital map reverse update journals, in addition to one or more, and preferably a plurality of, digital map forward update journals.

Preferably the or each digital map update repository comprises a plurality of digital map reverse update journals in respect of different given versions of the baseline map, each digital map reverse update journal comprising data that may be used to update the baseline map from the given version to another earlier version. The reverse update journals are preferably in respect of successive versions of the baseline map. Preferably the plurality of different given versions of the baseline map are successive versions of the baseline map, wherein the digital map reverse update journals each respectively comprise data that may be used to update the baseline map from a given version to a next earlier version of the plurality of successive versions of the baseline map.

Preferably, for each digital map forward update journal that is provided, a corresponding digital map reverse update journal is provided which will reverse the effect of the digital map forward update journal. Each reverse journal comprises data indicative of a set of one or more incremental updates that will reverse the effects of the forward update journal and revert the another later version of the baseline map back to the given version. Thus, for each forward journal which provides data enabling a given version, e.g. version x of the baseline map to be updated to a later version x+1, a reverse journal is provided, for reverting version x+1 back to version x. In these embodiments, each of the one or more given versions of the baseline digital map in relation to which reverse journals are provided is one version later than a corresponding one of the one or more given versions of the baseline digital map in relation to which a forward journal is provided.

In some preferred embodiments the or each digital map update repository comprises: a plurality of digital map forward update journals, each being in respect of a respective given version of the baseline map to which the digital map update repository relates, wherein each digital map update journal comprises, for a given version of the baseline digital map, data indicative of a set of one or more incremental updates that may be used to update the given version of the baseline map to another later version; and a plurality of digital map reverse update journals, each being in respect of a respective given version of the baseline map to which the digital map update repository relates, wherein each digital map reverse update journal comprises, for a given version of the baseline digital map, data indicative of a set of one or more incremental updates that may be used to update the given version of the baseline map to another earlier version. Preferably a digital map reverse update journal is provided in respect of each digital map forward update journal for reversing the effects of the forward update journal and reverting the another later version of the baseline map back to the given version.

The forward update journals preferably provide incremental update data for updating a version of the map in a single step manner from version to version.

In these preferred embodiments of the invention, an update repository comprises data that will enable any forward update to be "undone", if this is required.

In accordance with a further aspect of the invention there is provided a digital map update system, comprising, for each of one or more baseline digital maps, at least one digital map update repository comprising data which may be communicated to one or more remote client devices for use by the or each remote client device in incrementally updating an existing digital map of the device, wherein the or each digital map update repository comprises:

one or more digital map forward update journals, each digital map forward update journal being in respect of a respective given version of the baseline map to which the digital map update repository relates, wherein the or each digital map forward update journal comprises, for a respective given version of the baseline digital map, data indicative of a set of one or more incremental updates that may be used to update the given version of the baseline map to a later version; and one or more digital map reverse update journals, each digital map reverse update journal being in respect of a respective given version of the baseline map to which the digital map update repository relates, wherein the or each digital map reverse update journal comprises, for a respective given version of the baseline digital map, data indicative of a set of one or more incremental updates that may be used to revert the given version of the baseline map to an earlier version, wherein a digital map reverse update journal is provided for each digital map forward update journal, the set of one or more incremental updates of the or each digital map reverse update journal being for reversing the effects of the or a digital map forward update journal and reverting the later version of the baseline map back to the earlier version.

The present invention in this further aspect may include any or all of the features described in relation to the earlier aspect of the invention, and vice versa, to the extent that they are not mutually inconsistent.

In these further aspects and embodiments of the invention a plurality of digital map forward update journals are preferably provided in respect of each of a plurality of different respective given versions of the baseline map, preferably wherein the given versions of the map are successive versions, and wherein each digital map forward update journal comprises, for a respective given version of the baseline digital map, data indicative of a set of one or more incremental updates that may be used to update the given version of the baseline map to a successive later version.

In these preferred aspects and embodiments of the invention, the or each digital map update repository comprises one or more, and preferably a plurality of, pairs of digital map update journals in respect of a given version of the baseline digital map to which the repository relates, and preferably in respect of each of a plurality of different given versions of the baseline map, each pair of digital map update journals comprising a forward update journal comprising data indicative of a set of one or more incremental updates that may be used together with digital map data indicative of the given version of the baseline map to update the given version of the baseline map to a later version, and a corresponding reverse update journal comprising data indicative of a set of one or more incremental updates that may be used together with digital map data indicative of the another later version of the baseline map to revert the later version of the baseline map back to the given version.

In preferred aspects or embodiments of the invention in which both forward and reverse digital map update journals are provided, the digital map update repository may comprise data enabling a given version of a baseline map, e.g. corresponding to an existing digital map of a client device, to be updated in either direction, to an earlier or later version, and, depending upon the number of versions in respect of which forward and/or reverse update journals are provided, to any particular earlier or later version of the map.

This may enable a version of the baseline map held by a client device to be reverted to an earlier version, if the update version has caused problems. Update data from one or more, or a subset of, the forward or reverse digital map update journals may be provided to a remote client device or devices to enable updating of an existing map of the device through a desired number of versions in either direction.

Preferably the sets of incremental updates of different update journals of a repository where multiple such journals are provided, e.g. forward or reverse journal, are cumulative. In this way, incremental update data from multiple update journals for successive versions of a digital map can be bundled together and implemented as a single set of updates for updating a version of the baseline map. The bundled set of updates will update the digital map through multiple intermediate versions to a final version corresponding to the latest version for updating to which incremental update data is provided.

The digital map update system preferably comprises means for communicating data from the one or more digital map update journals of the or each digital map update repository, i.e. from one or more digital map forward update journal or one or more digital map reverse journal where provided, to one or more remote client devices for use by the or each device in updating an existing digital map of the device. The data that is communicated comprises the data from the journal indicative of the set of one or more incremental updates that may be used to update a given version of the baseline map to another, i.e. later or earlier version. In embodiments the entire set of one or more incremental updates of a given journal is communicated. The system may comprise one or more remote client devices, each of which comprises means for receiving such data and using the data to update an existing digital map of the device.

Preferably the system comprises a digital map update server arranged to communicate data from the digital map update repository system, i.e. from one or more digital map update repository thereof, to one or more remote client devices. In preferred embodiments, any of the steps involved in communicating data to a client device or devices, or in determining the data to be communicated, are carried out by the digital map update server. The digital map update server is in communication with the digital map repository system and a plurality of remote client devices. The server is able to access the or each digital map update repository of the system, and the or each digital map update journal thereof, for obtaining data therefrom for communication to a client device or devices.

The steps involved in communicating data to a remote client device will be described by reference to communicating data to a device or devices from one or more update journals of a digital map update repository in respect of a given baseline map. Where a plurality of digital map update repositories are provided in respect of a given baseline map, data may be provided to one or more client devices from any one or ones of the repositories in accordance with any of the embodiments described. In particular, the present invention in accordance with the further aspects described below, in which multiple digital map update repositories are provided in respect of each baseline map, for different update profiles, data may be provided to devices from any one of the update repositories for a given baseline map in accordance with any of the embodiments described below for updating a digital map of a device in accordance with a particular update profile.

The present invention extends to a method of incrementally updating an existing digital map of a client device in a digital map update system in accordance with the invention in any of its aspects or embodiments. The method may comprise communicating data from a digital map update journal or journals of a digital map update repository of the system to a set of one or more remote client devices for use by the or each device in updating an existing digital map of the device. The set of one or more remote client devices are devices having an existing map that is a version of the baseline map to which the digital map update repository relates. The method may comprise selecting the digital map update repository relating to the baseline map of a client device, and providing incremental data from one or more update journals thereof to the device.

The digital map update journal or journals may be forward journals or reverse journals, where provided. Preferably the method comprises communicating data at least from one or more digital map forward update journals of a digital map update repository to a set of one or more remote client devices. The method may alternatively or additionally comprise communicating data from one or more digital map reverse update journals of a digital map update repository to a set of one or more remote client devices.

In accordance with another aspect of the invention there is provided a method of incrementally updating an existing digital map of a remote client device in a digital map update system, the digital map update system comprising, for each of one or more baseline digital maps, at least one digital map update repository comprising data which may be communicated to one or more of the remote client devices for use by the or each remote client device in incrementally updating an existing digital map of the device, wherein the or each digital map update repository comprises one or more digital map update journals, each digital map update journal being in respect of a given version of the baseline map to which the digital map update repository relates, wherein each digital map update journal comprises, for a respective given version of the baseline digital map, data indicative of a set of one or more incremental updates that may be used to update the given version of the baseline map to another version, and wherein the method comprises communicating, from one or more digital map update journals of a digital map update repository to one or more remote client devices for use by the or each device in updating an existing digital map of the device, the data indicative of the set of one or more incremental updates that may be used to update the given version of the baseline map to another version.

The present invention in this further aspect may include any or all of the features described in relation to the earlier aspects of the invention, and vice versa, to the extent that they are not mutually inconsistent. Thus, if not explicitly stated herein, the method of the present invention may involve carrying out any of the steps that are implemented by the system, and vice versa.

In accordance with a further aspect of the invention, there is provided a method of incrementally updating an existing digital map of a remote client device in a digital map update system, the digital map update system comprising, for each of one or more baseline digital maps, at least one digital map update repository comprising data which may be communicated to one or more of the remote client devices for use by the or each remote client device in incrementally updating an existing digital map of the device, wherein the or each digital map update repository comprises:

one or more digital map forward update journals, each digital map forward update journal being in respect of a respective given version of the baseline map to which the digital map update repository relates, wherein the or each digital map forward update journal comprises, for a respective given version of the baseline digital map, data indicative of a set of one or more incremental updates that may be used to update the given version of the baseline map to a later version; and one or more digital map reverse update journals, each digital map reverse update journal being in respect of a respective given version of the baseline map to which the digital map update repository relates, wherein the or each digital map reverse update journal comprises, for a respective given version of the baseline digital map, data indicative of a set of one or more incremental updates that may be used to revert the given version of the baseline map to another earlier version, wherein a digital map reverse update journal is provided for each digital map forward update journal, the set of one or more incremental updates of the or each digital map reverse update journal being for reversing the effects of the or a digital map forward update journal and reverting the later version of the baseline map back to the earlier version, and wherein the method comprises communicating, from one or more of the forward digital map update journals of a digital map update repository and/or from one or more of the reverse digital map update journals of a digital map update repository to one or more remote client devices for use by the or each device in updating an existing digital map of the device, the data indicative of the set of one or more incremental updates that may be used to update the given version of the baseline map to another version.

The present invention in these further aspects may include any or all of the features described in relation to the earlier aspects of the invention, and vice versa, to the extent that they are not mutually inconsistent. Thus, if not explicitly stated herein, the method of the present invention may involve carrying out any of the steps that are implemented by the system, and vice versa. The method of these further aspects and embodiments of the invention is a computer implemented method.

In accordance with those aspects or embodiments of the invention in which data from one or more update journal comprising a set of one or more incremental updates is provided to at least one client device, references to data being provided to "a" or "the" client device, or similar herein, should be understood to refer to "at least one client device" unless the context demands otherwise.

The or each remote client device for communication to which data may be communicated from one or more update journal may be of any suitable type.

The client device may be a mobile device. The mobile device is a device that may be carried by a user. The mobile device may be, for example, a tablet, mobile phone, or PDA or the like, but is preferably a mobile navigation device. The navigation device may be associated with a vehicle. The navigation device may be a portable navigation device (PND) or an integrated in-vehicle navigation device. Alternatively the client device may have a fixed location. For example the client device may be a personal computer, server or other computing resource.

In embodiments in which the client device is a navigation device, the navigation device may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. The navigation device may preferably include global navigation satellite systems (GNSS), such as GPS (Global Positioning System), signal reception and processing functionality. The device may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In some embodiments the client device is selected from: a server; portable navigation device (PND); mobile phone; computing device; and an in-vehicle integrated navigation device. The plurality of client devices to which incremental update data may be communicated may be of any of these types, and may include more than one type of client device.

The or each client device is a device having an existing digital map. The existing digital map is associated with the client device. Preferably the client device stores the existing digital map. The client device may comprise a memory storing the existing digital map.

The method in accordance with these further aspects or embodiments in which data is communicated to a set of one or more client devices, the method may comprise communicating data to the one or more remote client devices from one, or from a plurality, of either the digital map forward or reverse update journals. It is envisaged that data could be communicated from a combination of one or more forward and one or more reverse update journals, though typically data will be provided from either one or more forward journals or one or more reverse journals. Data from multiple forward or reverse update journals may be bundled together for communication to a client device. The device may then implement the data by implementing a set of incremental updates that comprises each of the sets of incremental updates from the journals. Thus, updates from multiple journals may be implemented together.

The number of journals, whether forward or reverse, from which data is communicated to a device will depend upon the number of versions by which an existing version of the baseline map held by a client device is to be changed. Providing data from multiple digital map forward journals of a given repository in respect of different versions of the baseline digital map, or alternatively from multiple digital map reverse journals from a given repository in respect of different versions of the baseline digital map, enables the existing digital map of the client device to be updated through a number of versions corresponding to the number of update journals from which data is provided. For example, in order to update an existing map that is in accordance with version 2 of a baseline map to version 4, data may be provided from digital map forward update journals that respectively provide a set of incremental updates for updating version 2 of the map to version 3, and for updating version 3 of the map to version 4. A similar process may be used to revert an existing digital map that is a later version of the baseline map to an earlier version, using data from one or more reverse update journals.

In some embodiments the method may comprise providing incremental update data to the set of one or more client devices from each forward update journal of an update data repository. This may allow the existing map of a device to be updated to a latest version. In other embodiments the method comprises providing incremental update data from a subset of the forward update journals. The same may be carried out in relation to reverse update journals. In some cases, the existing digital map of a client device may not be the oldest version of the map in respect of which a forward update journal is provided. In some embodiments the method may comprise providing incremental update data to a client device from the forward update journal or journals necessary to provide incremental update data for updating the existing digital map of the device from a current version to a latest version.

In embodiments in which the digital map data repository system comprises a set of one or more digital map update repositories in respect of each of a plurality of different baseline maps, the method preferably comprises providing data from only one of the repositories to any set of one or more devices, wherein the existing digital map of the or each device is a version of the baseline map to which the repository relates.

In accordance with the invention, the data from an update journal, whether forward or reverse, is used together with data indicative of the given version of the baseline map to which the journal relates to update an existing digital map of a client device to another version.

The method extends to the step of a remote client device receiving the data from one or more digital map update journal, e.g. one or more forward or reverse update journal, the data from the or each journal being indicative of a set of one or more incremental updates in respect of a given version of the baseline digital map for use in updating the existing digital map of the device to another e.g. later or earlier version, and using the received data to update the existing digital map of the device to another version.

In accordance with the invention in any of the aspects or embodiments in which data from an update journal is used to update an existing digital map of a remote client device, the data is used together with data indicative of the given baseline map version to which the journal relates to update the existing digital map of the remote client device from a given version to another version, e.g. a later or earlier version depending upon whether the journal is a forward or reverse journal. The data from the update journal comprises data indicative of a set of one or more incremental updates that may be used together with digital map data indicative of a given version of the baseline map to update the given version of the baseline map to the another version.

The data indicative of the given version of the baseline map may be communicated to the device by the digital map update repository in respect of the baseline map and/or may be comprised by the device. The data indicative of the given version of the baseline map is indicative of the full given version of the baseline map. The data indicative of a given version of the map may be, or be based upon, the existing digital map data of a device. In some preferred embodiments the existing digital map of the remote client device corresponds to the given version of the baseline digital map to which the update journal relates. In other embodiments the data is based upon the existing digital map data of the device and data indicative of a set of one or more incremental updates from one or more other digital map update journal for updating the existing digital map to another version. Where update data from multiple update journals is provided to one or more client devices, the existing digital map of the or each device corresponds to one of the given versions to which the update journals from which the data is provided relates. This will typically be the update journal relating to the earliest map version in the case of forward journals, or the latest, in the case of reverse journals. The remote client device may then use the incremental update data from the update journal to update the existing digital map to the earlier or later version of the baseline map. The method may therefore comprise providing data indicative of the given version of the baseline map together with the incremental update data for updating the map from the given version of the baseline map from an update journal to a remote client device. In preferred embodiments only the incremental update data is provided to a remote client device from an update journal.

By way of example, data may be received from a forward update journal for updating an existing digital map of the device, that is version x of the baseline map, to version x+1. This update may be implemented using the set of one or more incremental updates received from the journal and the existing digital map data of the device, to update the version of the existing map to version x+1. If it is desired to update the digital map of the device to version x+2, the relevant set of incremental updates for updating the map from version x+1 to version x+2 may be received from another forward update journal and applied to the version x+1 data that has been created using the original existing digital map data of the device and the first set of update data from the other update journal. Of course, different sets of incremental updates may be bundled together and implemented together in relation to existing digital map data to update the map data through multiple versions, without specifically obtaining the intermediate full digital maps. Thus, the data indicative of a given version of a digital map in relation to which a set of incremental update data is implemented may be provided by existing digital map data of the device and optionally one or more other set of incremental update data received from one or more other digital map update journals.

In preferred embodiments the method comprises communicating only data indicative of a set of one or more incremental updates for use in updating a given version of the baseline digital map to another version from one or more digital map forward or reverse update journal of a digital map update data repository to a remote client device for use by the device in updating an existing digital map thereof that corresponds to a version of the baseline digital map, and not full digital map data in respect of any version of the baseline digital map.

In embodiments in which update data is provided to a set of one or more client devices from a plurality of digital map forward update journals or a plurality of digital map reverse update journals, the plurality of digital map forward or plurality of reverse update journals from which update data is provided to the one or more remote client devices are preferably journals in respect of successive versions of the digital map.

Preferably the or each digital map update repository in respect of a given baseline map further comprises data indicative of the full baseline digital map for a version thereof. In some embodiments the repository comprises full baseline digital map in respect of only a single version of the baseline map. The version of the baseline map in relation to which full digital map data is provided may be any given version of the digital map in relation to which an update journal is provided. The version is a version in relation to which a forward update journal is provided for updating to or from and/or in relation to which a reverse update journal is provided for updating to or from.

Preferably the digital map update repository comprises full baseline digital map data for a latest version of the map. The forward and reverse update journals may then provide sets of updates for updating the map between the version and one or more earlier versions. In some preferred embodiments the digital map update repository comprises full baseline digital map data for a latest version of the digital map, and at least a forward update journal for updating a successive previous version of the digital map to the latest version of the map. A complementary reverse journal is preferably provided.

By providing full digital map data for a given version of the map together with forward or reverse, and preferably both forward and reverse, update journals for updating the given version to one or more earlier or later version, it is possible to replicate the full map data for any particular one of the versions. The full map data may be provided to a client device together with update data to enable the device to construct any particular full version of the map, e.g. for initial set up, or if the existing map of the device has been lost or needs replacing for some reason. Thus, while the present invention is direct to providing incremental update data to client devices, to avoid providing full map data, in preferred embodiments the update system also enables full map replacement for remote client devices to be implemented. By storing the full digital map data for a baseline map in a digital map update repository specific to the baseline map, together with one or more update journals comprising incremental update data for the map, consistency in the updated map versions may be maintained.

In other arrangements a digital map update repository may comprise full baseline digital map data for a latest version of the map in respect of which a reverse update journal is provided and/or an earliest version of the map in respect of which a forward update journal is provided. The forward and reverse update journals may then provide sets of updates for updating the map between the version and one or more later versions. In some embodiments the digital map update repository comprises full baseline digital map data for an earliest version of the digital map, and one or more forward update journals in respect of one or more successive versions of the digital map.

In embodiments in which data is provided from a digital map update repository to one or more remote client devices, the data may be provided to the or each device automatically, or in response to a request by the or each device. For example, in some embodiments data from a forward update journal may be automatically provided to one or more client devices when the journal is created, or data from the or each update journal added since a last update may be periodically communicated to the or each device.

In some embodiments the method may comprise determining the baseline digital map that corresponds to the existing digital map of a client device, and optionally the current version thereof, identifying a digital map incremental update repository for the baseline digital map, and providing incremental update data from one or more digital map update journals, e.g. forward or reverse journals, of the baseline map that may be used by the device to update the existing digital map of the device to another version. The method may comprise receiving the data indicative of the baseline digital map corresponding to the existing digital map and optionally the current version of the map from the device. However, in other embodiments this may be known to the update system, e.g. through a database linking device identifiers to map versions, etc. The system may determine such data using data indicative of an identity of the device. The update may be to a later or earlier version. The data may be provided from one or more digital map forward or reverse journals as described above.

The method may comprise identifying one or more digital map update journals of the repository from which to provide incremental update data for updating an existing digital map of a device to a given other version. The method may comprise identifying the journals using data indicative of the current version of the baseline map to which the existing map corresponds, and optionally data indicative of a version to which the existing map is to be updated. The version to which the existing digital map of a device is to be updated may be automatically determined, e.g. being a latest available version of the baseline digital map, or the method may comprise receiving data indicative of a desired version of the map from the device. The method may comprise receiving from the client device data identifying a desired updated version of the map, and providing data from one or more digital map update journals for use by the device in updating the existing digital map to the desired version, or providing data from the one or more digital map update journals for use by the device in updating the existing digital map to a most recent version. While the updated version or desired updated version will typically be a later version, such that data is selected from the forward update journals, it is envisaged that it may be an earlier version. For example a device may provide data indicative of a version of the baseline map to which it is desired to revert, and the method may comprise providing incremental update data from the reverse update journals required for implementing this change. This may occur, e.g. where a previous update implemented by the device has led to problems, such that the device wishes to "roll-back" to an earlier version.

In accordance with the invention in any of its aspects, the digital map update repository system comprises at least one digital map update repository in respect of the or each baseline digital map. In some preferred embodiments the system comprises a plurality of digital map update repositories in respect of the or each or a baseline digital map. Preferably, whether or not multiple digital map update repositories are provided, the or each digital map update repository for a given baseline map is in respect of a given update profile. In preferred embodiments in which a plurality of digital map update repositories are provided in respect of a given baseline digital map, each digital map update repository is preferably in respect of a different given update profile. In these preferred embodiments, the or each digital map update journal of the digital map update repository comprises, for a respective given version of the baseline digital map, data indicative of a set of one or more incremental updates that may be used to update the given version of the baseline map to another version in accordance with the given update profile of the update data repository.

It is believed that such embodiments are advantageous in their own right. Thus, in accordance with a further aspect of the invention there is provided a digital map update system, comprising, for each of one or more baseline digital maps, a plurality of digital map update repositories each comprising data which may be communicated to one or more remote client devices for use by the or each remote client device in incrementally updating an existing digital map of the device, wherein each digital map update repository for a given baseline map comprises data for incrementally updating the baseline digital map in accordance with a different given update profile, and wherein each digital map update repository comprises one or more digital map update journals, each digital map update journal being in respect of a given version of the baseline map to which the digital map update repository relates, wherein each digital map update journal comprises, for a respective given version of the baseline digital map, data indicative of a set of one or more incremental updates that may be used to update the given version of the baseline map to another version in accordance with the given update profile of the digital map update repository.

The present invention in this further aspect may include any or all of the features described in relation to the earlier aspects of the invention, and vice versa, to the extent that they are not mutually inconsistent. Furthermore, if not explicitly stated herein, the system may comprise means for carrying out any of the steps described in relation to the methods of the present invention, and vice versa.

Each digital map update repository for updating a given baseline digital map in accordance with a given update profile may be in accordance with any of the aspects or embodiments of the invention described above, and may comprise one or more digital map update journals in accordance with any of the aspects or embodiments of the invention described. Preferably each digital map update repository comprises a plurality of forward update journals and a plurality of reverse update journals as described in relation to the earlier aspects of the invention, in these embodiments, each update journal comprising a set of one or more incremental updates for updating a given version of the baseline map to provide another version thereof in accordance with the update profile of the repository.

Preferably each digital map update repository for a given baseline map comprises one or more, and preferably a plurality of, digital map forward update journals, each digital map forward update journal comprising, for a given version of the baseline digital map, data indicative of a set of one or more incremental updates that may be used to update the given version of the baseline map to another later version in accordance with the update profile of the repository.

Preferably each digital map update repository for a given baseline map comprises one or more digital map reverse update journals for the baseline map to which the digital map data repository relates, wherein each digital map reverse update journal comprises, for a given version of the baseline map, data indicative of a set of one or more incremental updates that may be used to update the baseline map from the given version to another earlier version in accordance with the update profile of the repository.

Preferably a plurality of digital map forward update journals are provided in respect of each of a plurality of different respective given versions of the baseline map, wherein the given versions of the map are successive versions, and wherein each digital map forward update journal comprises, for a respective given version of the baseline digital map, data indicative of a set of one or more incremental updates that may be used to update the given version of the baseline map to a successive later version in accordance with the update profile of the repository.

Preferably a digital map reverse update journal is provided in respect of each digital map forward update journal for reversing the effects of the forward update journal and reverting the another later version of the baseline map back to the given version.

In accordance with a further aspect of the invention there is provided a digital map update system, comprising, for each of one or more baseline digital maps, a plurality of digital map update repositories each comprising data which may be communicated to one or more remote client devices for use by the or each remote client device in incrementally updating an existing digital map of the device, wherein each digital map update repository for a given baseline map comprises data for incrementally updating the baseline digital map in accordance with a different given update profile, and wherein each digital map update repository comprises:

one or more digital map forward update journals, each digital map forward update journal being in respect of a respective given version of the baseline map to which the digital map update repository relates, wherein the or each digital map update journal comprises, for a respective given version of the baseline digital map, data indicative of a set of one or more incremental updates that may be used to update the given version of the baseline map to a later version in accordance with the update profile of the digital map update repository; and one or more digital map reverse update journals, each digital map reverse update journal being in respect of a respective given version of the baseline map to which the digital map update repository relates, wherein the or each digital map reverse update journal comprises, for a respective given version of the baseline digital map, data indicative of a set of one or more incremental updates that may be used to revert the given version of the baseline map to an earlier version in accordance with the update profile of the digital map update repository, wherein a digital map reverse update journal is provided for each digital map forward update journal, the set of one or more incremental updates of the or each digital map reverse update journal being for reversing the effects of the or a digital map forward update journal and reverting the later version of the baseline map back to the earlier version.

The present invention in this further aspect may include any or all of the features described in relation to the earlier aspects of the invention, and vice versa, to the extent that they are not mutually inconsistent. Furthermore, if not explicitly stated herein, the system may comprise means for carrying out any of the steps described in relation to the methods of the present invention, and vice versa. Preferably the system comprises a digital map update server in communication with each one of a plurality of remote client devices for providing data indicative of a set of one or more digital map incremental updates thereto from one or more of the digital map update journals of a given digital map update repository.

The present invention in these further aspects extends to a method of incrementally updating an existing digital map of a client device in a digital map update system in accordance with any of the embodiments of the invention, the method comprising communicating the data indicative of a set of one or more incremental updates from one or more digital map forward update journal, or one or more digital map reverse update journal of a digital map update repository of the system, to a set of one or more remote client devices for use by the or each device in updating an existing digital map of the device in accordance with the update profile of the update repository.

In accordance with a further aspect of the invention there is provided a method of incrementally updating an existing digital map of a remote client device in a digital map update system, the digital map update system comprising, for each of one or more baseline digital maps, a plurality of digital map update repositories each comprising data which may be communicated to one or more of the remote client devices for use by the or each remote client device in incrementally updating an existing digital map of the device, wherein each digital map update repository for a given baseline map comprises data for incrementally updating the baseline digital map in accordance with a different given update profile, and wherein each digital map update repository comprises one or more digital map update journals, each digital map update journal being in respect of a given version of the baseline map to which the digital map update repository relates, wherein each digital map update journal comprises, for a respective given version of the baseline digital map, data indicative of a set of one or more incremental updates that may be used to update the given version of the baseline map to another version in accordance with the update profile of the digital map update repository, and wherein the method comprises communicating, from one or more digital map update journals of a digital map update repository to one or more remote client devices for use by the or each device in updating an existing digital map of the device, the data indicative of the set of one or more incremental updates that may be used to update the given version of the baseline map to another version in accordance with the update profile of the digital map update repository.

In accordance with a further aspect of the invention there is provided a method of incrementally updating an existing digital map of a remote client device in a digital map update system, the digital map update system, comprising, for each of one or more baseline digital maps, a plurality of digital map update repositories each comprising data which may be communicated to one or more remote client devices for use by the or each remote client device in incrementally updating an existing digital map of the device, wherein each digital map update repository for a given baseline map comprises data for incrementally updating the baseline digital map in accordance with a different given update profile, and wherein each digital map update repository comprises:

one or more digital map forward update journals, each digital map forward update journal being in respect of a respective given version of the baseline map to which the digital map update repository relates, wherein the or each digital map update journal comprises, for a respective given version of the baseline digital map, data indicative of a set of one or more incremental updates that may be used to update the given version of the baseline map to a later version in accordance with the update profile of the digital map update repository; and one or more digital map reverse update journals, each digital map reverse update journal being in respect of a respective given version of the baseline map to which the digital map update repository relates, wherein the or each digital map reverse update journal comprises, for a respective given version of the baseline digital map, data indicative of a set of one or more incremental updates that may be used to revert the given version of the baseline map to an earlier version in accordance with the update profile of the digital map update repository, wherein a digital map reverse update journal is provided for each digital map forward update journal, the set of one or more incremental updates of the or each digital map reverse update journal being for reversing the effects of the or a digital map forward update journal and reverting the later version of the baseline map back to the earlier version, and wherein the method comprises communicating, from one or more of the forward digital map update journals of a digital map update repository and/or from one or more of the reverse digital map update journals of a digital map update repository to one or more remote client devices for use by the or each device in updating an existing digital map of the device, the data indicative of the set of one or more incremental updates that may be used to update the given version of the baseline map to another version in accordance with the update profile of the digital map update repository.

The present invention in these further aspects may include any or all of the features described in relation to the earlier aspects of the invention, and vice versa, to the extent that they are not mutually inconsistent. Furthermore, if not explicitly stated herein, the system may comprise carrying out any of the steps that the system comprises means for carrying out in accordance with the other aspects of the present invention, and vice versa.

As in the earlier aspects of the invention, preferably the method comprises a digital map update server carrying out the step of communicating data from one or more of the update journals, e.g. forward and/or reverse digital map update journals, of the digital map update repository to the one or more remote client devices. Preferably the system comprises a digital map update server for communicating data from the update journal(s) to the one or more remote client devices.

The steps involved in providing data from a digital map update repository to a client device, or the features relating to the construction of the digital map update journals in these further aspects in which multiple repositories are provided for a given baseline map in respect of different update profiles, may be in accordance with any of the embodiments described above in relation to the earlier aspects of the invention. For the avoidance of doubt, any one of the multiple digital map update repositories provided in respect of a given baseline map in these further aspects of the invention, or its digital map update journal(s), may be in accordance with any of the embodiments described for the digital map update repository or its journal(s) in respect of a given baseline digital map in the earlier aspects of the invention, the only difference being that each update repository, and hence the digital map update journals thereof, are for incrementally updating a digital map in accordance with a given update profile. In these embodiments, the repository structure of a single digital map repository as described above for a given baseline map is replicated with each different repository comprising data for updating a set of one or more remote client devices in accordance with a different update profile.

In accordance with these further aspects or embodiments of the invention, the digital map update system organises digital map incremental update data for a given baseline map in respective digital map incremental update data repositories, which are each in respect of different incremental update profiles. In this way, the data may readily be provided, for example, by a digital map update server to a client device or devices for incrementally updating an existing digital map of the device corresponding to a version of the baseline map in accordance with a given digital map update profile by selecting the update repository having incremental update data for updating the baseline map in accordance with the update profile, and selecting incremental update data from a journal or journals of the given digital map update repository, and providing the data to the device. Rather than simply providing a client device whose map is to be updated with all incremental update data since, for example, the last incremental update of the map, or since the previous map version for the baseline map, the present invention allows only selected digital map incremental update data to be provided to the client device, which is in accordance with a given incremental update profile.

Each update repository in respect of a given baseline map may comprise a different set of incremental update data for updating the baseline map in accordance with a different update profile. The set of incremental update data is provided in the one or more digital map update journals of the repository.

The Applicant has recognised, that by arranging incremental update data in repositories specific to different update profiles in this way, a client device may be more readily provided with data for incrementally updating a given baseline map in accordance with a desired update profile. This enables, for example, only core updates to be provided and not other "value added" updates, depending upon the capabilities of the device, or user preferences. A device may be associated with an update profile, such that incremental update data for that device will be selected from the digital map update repository in respect of that update profile, i.e. from one or more update journals thereof. Different update repositories in respect of different update profiles may be used for updating different sets of client devices which use the same baseline digital map.

The system may be arranged such that different update frequencies are associated with digital map update repositories in respect of different update profiles for a given baseline map. For example, update data from a digital map update repository associated with one update profile may be provided to client devices with greater frequency than that provided to other devices from a digital map update repository associated with a different update profile. The digital map update repositories for the different update profiles may each be arranged to bundle together different updates that may suitably be provided to client devices as a set of incremental updates. For example, updates that can be provided at the same frequency may be added to the same update repository. For example, core map updates, such as those relating to the geometry and/or connectivity of segments of the digital map, may be provided with lesser frequency than POI update data, such as petrol station prices, which is more susceptible to change. By arranging incremental update data for providing updates in accordance with different update profiles into separate digital map update repositories for each profile, it is possible to transmit only incremental update data in accordance with a particular profile to a device or devices. This enables only relevant, or desired data to be provided to a device, reducing the need for post-filtering of received data by the device or by a server prior to transmission.

In accordance with the invention, a plurality of digital map update repositories are provided for incrementally updating a given baseline map in accordance with respective ones of a plurality of different digital map update profiles. The incremental update data of each repository, e.g. the sets of incremental updates comprised by the update journal or journals thereof, comprises data indicative of incremental updates that have been grouped together for the purposes of incrementally updating the baseline digital map in accordance with a given update profile. The groups of updates may be chosen in any desired manner. The incremental updates in respect of which a given digital map update repository comprises data are updates that are for updating an existing digital map in a manner consistent with the update profile of the repository.

A given update profile may define one or more requirements to be met by an incremental update in order for it to be consistent with providing updating of a digital map in accordance with the profile. A given update repository associated with the update profile will then comprise data indicative of incremental updates meeting the one or more requirements. The requirements may be in relation to any or all of a type of the update, a level of detail of the update, a source of the update, a frequency with which the data is to be provided to a device, etc.

In some embodiments the incremental updates of a given digital map update repository for updating a digital map in accordance with a given update profile, are similar in one or more respects. In these embodiments the or each set of incremental updates comprised by the or each update journal of a given digital map update repository for updating the baseline digital map in accordance with a given digital map update profile will be similar in one or more respects. The similarity may be by reference to a frequency with which the updates are required to be provided to a client device, a type of the update (e.g. a subject of the update), a level of detail of the update, a source of the update, etc. In some embodiments, therefore, each update profile is selected such that the digital map update repository comprising incremental update data for updating the baseline digital map in accordance with that profile comprises data indicative of incremental updates that are similar in relation to one or more of: a type of the update; a frequency with which the update is to be provided to a device; a source of the update; and a level of detail of the update.

In some preferred embodiments the different update profiles associated with different update repositories for a given baseline map are selected to result in the map update repositories comprising incremental update data for incrementally updating a baseline map to different extents. In some preferred embodiments the different update profiles in respect of which digital map incremental update data repositories are provided result in the data repositories defining respective groups of incremental updates of differing levels of complexity and/or detail. In some embodiments the update profiles result in digital map incremental data repositories respectively defining a group of incremental updates for providing a core update level to a client device or devices and one or more further groups of incremental updates for providing an update level to a client device or devices of a respectively higher level of detail and/or complexity. Thus, different update profiles may result in the repositories comprising data that will result in digital maps of client devices corresponding to the baseline map being updated to differing extents. In other words, certain of the profiles result in a repository having data for providing a more comprehensive update level than others. This may enable maps of certain devices to be updated to a more minimal extent, e.g. if the user prefers this option, or if the device has limited data processing and/or storage capability.

In some embodiments the digital map data repository system comprises, for each of one or more baseline digital maps, a first digital map update repository comprising data for incrementally updating the baseline digital map in accordance with a first update profile, and a second digital map update repository comprising data for incrementally updating the baseline digital map in accordance with a second update profile, wherein the first update profile results in the first digital map update repository comprising incremental update data for updating the baseline digital map to a first level of complexity and/or detail (or extent), and the second update profile results in the second digital map update repository comprising incremental update data for updating the baseline digital map to a second level of complexity and/or detail (or extent), wherein the first level of complexity and/or detail (or extent) is different to, e.g. greater than, the second level of complexity and/or detail (or extent). In some embodiments the second digital map update repository may comprise digital map incremental update data for providing only incremental updates which are essential to ensure that the baseline digital map may continue to be executed by a device.

In some embodiments a digital map update repository in respect of a given update profile may comprise incremental update data in respect of one or more of the following types of incremental update.

The incremental update data may be in respect of incremental updates relating to a particular feature or features of the baseline digital map. For example the incremental updates may be in relation to a given one or ones of: a point of interest (POI); the geometry and/or connectivity of one or more navigable segments of the digital map; an attribute of a segment of the digital map, e.g. a road segment attribute; and a given content data layer. An incremental update may be in respect of the modification, addition, enhancement, extension, correction or deletion of any of these features of the digital map. The profile may impart more specific requirements in relation to the feature of the digital map to which an incremental update must relate, e.g. that it relates to a road segment having a given level of importance, to a particular type of POI, etc.

Alternatively or additionally, the profile may require that an incremental update relates to a given geographic region, e.g. to the modification, addition, enhancement, extension, correction or deletion of a feature of the region. The geographic region may be of any extent, and may or may not be user specified. For example, the geographic region may be a region corresponding to a particular country, city, county etc. The geographic region may be a predetermined region based upon, e.g. centred upon, a position associated with the client device, e.g. a region of given radius centred upon a position. The position may be a current position of the device, a home location of the device, or a position defined with respect to a pre-calculated route being navigated by the device.

The profile may alternatively or additionally require that an incremental update to be included in an update data repository in accordance with the profile is of a particular type, e.g. relating to the modification, addition, enhancement, extension, correction or deletion of a feature of the digital map.

A profile may alternatively or additionally require that an update is from a given source, e.g. whether from the navigation system digital map supplier, a vehicle manufacturer or other third party.

In embodiments, the, each or an update profile is a predetermined profile specifying one or more types of incremental update in respect of which data may be included in the digital map update repository for the update profile, wherein the incremental update is required to relate to a given one or ones of: a point of interest (POI); the geometry and/or connectivity of one or more navigable segments of the digital map; an attribute of a segment of the digital map; a given content digital map data layer; a given geographic region; a particular type of update; and a particular source of update.

The profile may alternatively or additionally specify a level of importance of incremental updates to be included in a digital map update repository for updating a baseline map in accordance with the profile. For example, by setting a high level of importance threshold for incremental updates associated with a repository, a digital map update data repository may be arranged to include only key updates. By setting a lower level of importance threshold, a data repository may be arranged to include updates that are of a desirable, though less essential nature.

The update profiles associated with different digital map update repositories may be arranged to result in the repositories comprising data in respect of groups of incremental updates that relate to modular units of the digital map structure, in respect of which client devices are arranged to implement all updates together. This may facilitate implementation of the updates in that they may all apply to a unit of the map structure in respect of which all relevant updates are implemented together. For example, the modular units may be "building blocks" of a Navigation Data Standard (NDS) system.

Each digital map update data repository is preferably associated with data indicative of the update profile for the repository. Data indicative of the digital map incremental update profile for a given digital map update data repository may be used to ensure that only data indicative of digital map incremental updates in accordance with the profile is included in the repository.

The or each update profile may be specified in any suitable manner, and may be user specified, or may be specified, e.g. by a supplier of the digital map or a client device manufacturer. In some preferred embodiments the update profile is user specified. The method may comprise the step of defining the or each update profile.

The method extends to providing the digital map data repository system having the plurality of digital map incremental update data repositories. It is envisaged that update profiles, and hence digital map data repositories in respect of the profiles, may be added as required by digital map update providers. The providers may be digital map data providers e.g. who provide baseline digital map data, or may be other entities that may only provide update data relating to certain aspects of the baseline map e.g. a vehicle manufacturer who may provide POI data for addition to a baseline map. The method may comprise the step of defining an update profile, and creating a digital map update repository in respect of a given baseline digital map for containing digital map incremental update data for use in updating the baseline digital map in accordance with the update profile. The method may comprise receiving incremental update data from one or more data feed, and adding data indicative of an incremental update to a digital map update repository only when the incremental update can be used for updating the digital map in accordance with the update profile.

The update profiles may be set as desired to result in the incremental update data repositories having desired groups of incremental updates, to enable a client device to receive the updates from the relevant groups together. It is envisaged that more incremental update data repositories could simply be added to the data repository system as needed to provide desired tailoring of update provision, e.g. in accordance with wishes of device users or manufacturers, or digital map update providers. For example, digital map updates emanating from a vehicle manufacturer, and of relevance to users of devices associated with their vehicles, e.g. including POI in respect of a service network, may be provided to a dedicated data repository by associating an appropriate update profile therewith. Such updates may then be provided to devices independently of other types of update, for example, from the digital map provider.

It will be appreciated that the present invention in accordance with any of its aspects or embodiments provides a flexible system in which digital map incremental update data repositories may be added or removed as required.

It is envisaged that data indicative of the same incremental update may be comprised by more than one update data repository provided that the update is in accordance with the update profile for each data repository.

The method may comprise analysing data indicative of a received incremental update for a given baseline map in relation to the incremental update profiles of each digital map update data repository of the repository system in respect of the baseline map, and adding data indicative of the received incremental update to an update journal of the or each data repository in respect of, i.e. associated with, an update profile with which the incremental update is in accordance. The method may comprise adding data indicative of the update to an existing update journal or creating a new journal for containing the data. The step may be performed in respect of one or more, and preferably a plurality of, received incremental updates. The step of analysing a received update may be performed by a processing means of the repository system, or any other suitable part of the digital map update system. The system may be arranged to analyse received incremental updates for allocation to an update data repository in any suitable manner. In some embodiments data indicative of the digital map incremental update profile of each digital map update data repository is used as a filter to allow only data indicative of those incremental updates in accordance with the update profile of the update data repository to be stored in the repository. Of course, in other arrangements, a particular provider may only provide incremental updates in accordance with a given update profile, e.g. a vehicle manufacturer, in which case the incremental update data may simply be added to an update journal of the repository in respect of that update profile without first analysing the updates. Thus, incremental update data from certain sources may be provided directly to certain update repositories associated with certain update profiles.

Data may be provided from a digital map update repository for a given baseline map in respect of a particular update profile from one or more journals thereof to a set of one or more client devices in accordance with any of the embodiments earlier described. In accordance with the invention each update repository comprises one or more update journals comprising incremental update data, and the incremental update data provided to a set of one or more client devices is provided from one or more of the journals.

The client devices will be devices having an existing digital map that corresponds to a version of the baseline map. The method may comprise providing incremental update data from a first digital map update repository in respect of a baseline map for updating the baseline map in accordance with a first update profile to a set of one or more client devices having an existing digital map that is a version of the baseline map, and providing incremental update data from a second update repository in respect of the baseline map for updating the baseline map in accordance with a second update profile to a set of one or more different client devices having an existing digital map that is a version of the baseline map. In other words, data from different repositories may be provided to different sets of client devices which use a given baseline map in order to update the map in accordance with different update profiles.

The devices that receive incremental update data from a particular update repository associated with a given update profile may be devices that are associated with the given update profile of the repository. For example, the update profile for a device may be user specified, or may be specified by a manufacturer. In other embodiments it is envisaged that the method may comprise, for example, a digital map update server, determining an update repository in respect of a given update profile from which to provide update profile to a given device. The determination may be based upon a device type, etc. For example, mobile phones may be provided with incremental update data from a repository in respect of an update profile that provides only core type updates to avoid an excessive burden upon the processing power or memory of the device. In some embodiments each client device is associated with an incremental update profile.

The method may comprise providing incremental update data from a first digital map update repository in respect of a baseline map for updating the baseline map in accordance with a first update profile to a set of one or more client devices with a first frequency, and providing incremental update data from the second digital map update repository in respect of the baseline map for updating the baseline map in accordance with a second update profile to a set of one or more client devices with a second frequency, wherein the second frequency is greater than the first frequency.

As described in respect of the earlier embodiments, digital map incremental update data may be provided to the at least one client device from a digital map update data repository in accordance with a particular update profile automatically or in response to a request by the or each client device. A client device may be arranged to automatically request update data at intervals. In some embodiments the data is provided automatically, e.g. at predetermined intervals, or when triggered, e.g. when a new update journal is added to the incremental update repository, etc. In some embodiments the or each client device may be arranged to retrieve the incremental update data from an update data repository.

The method may comprise a digital map update server providing data indicative of a set of one or more incremental updates from a digital map update repository for a given baseline map associated with a given update profile to one or more remote client devices. It will be appreciated that steps described herein in relation to "the" client device may be applicable to the or each client device as appropriate to which data is provided. In preferred embodiments the update server provides the data indicative of a set of one or more incremental updates from the given repository to a plurality of the client devices, preferably simultaneously. The plurality of client devices is preferably a subset of the plurality of client devices of the system. In other words, the update data is provided to some, but not all, of the client devices of the system. It is envisaged that the devices may be selected by reference to an update profile associated with the devices. The update server may broadcast the data to a plurality of client devices.

The data indicative of the set of one or more digital map incremental updates is preferably provided to the or each client device(s) without filtering the data.

The method comprises the digital map update server providing data indicative of one or more incremental updates to a client device from a given one of the digital map incremental update data repositories in respect of a baseline map, and in respect of a given update profile, to thereby provide the client device with incremental update data in accordance with the given incremental update profile associated with the repository. The update server may select a digital map update data repository from which to provide the data to a client device by reference to the update profile of the repository, for example, by using data indicative of the update profile associated with the repository.

The method may comprise the digital map update server providing data indicative of a set of one or more digital map incremental updates from another digital map update data repository in respect of the same baseline map, and in respect of a different update profile, to at least one other client device for updating an existing digital map of the other client device or devices in accordance with the different given incremental update profile of the other digital map update data repository.

It will be appreciated that the invention in these further aspects and embodiments in which update repositories are provided in respect of different update profiles allows data indicative of incremental updates to be provided to client devices on a profile by profile basis. In embodiments the method comprises providing data to at least one client device from a given one of the digital map update data repositories for a baseline map in respect of a given update profile, and not from another one, or the other ones, of the plurality of update data repositories for the baseline map that are in respect of different update profiles.

In embodiments data indicative of a set of one or more digital map incremental updates is provided to at least one client device from a given digital map update data repository for a baseline map in respect of a given update profile without providing digital map incremental update data to the at least one client device from any other one of the digital map incremental update data repositories for the baseline map in accordance with other update profiles.

In some embodiments the method may comprise, for example, a digital map update server using data indicative of a given digital map incremental update profile for a given client device to select the digital map update data repository from which to provide a set of incremental update data to the device. The digital map update server may then select the digital map update repository in respect of the given digital map update profile from which to provide data. The method comprises selecting the repository from among the repositories in respect of the given baseline digital map which corresponds to an existing digital map of the device. A determination of the baseline digital map that is used by a client device, i.e. such that an existing digital map of the client device corresponds to a version of the baseline map, may be made in any of the manners described in relation to the earlier embodiments.

Data indicative of a given digital map update profile for a client device may be obtained, e.g. by an update server in any suitable manner, and may be indicative of a desired digital map update profile. The update profile data may be specified by a user, a client device, or device manufacturer, for example. The profile data may be default profile data for a given type of client device. A digital map update server may have access to data indicative of one or more update profiles to be used for each of a plurality of different client device types. The desired update profile data may be received by the update server from the client device, e.g. an update management system thereof, or the server may have access to a database comprising data indicative of a plurality of update profiles and devices with which they are to be used. In some embodiments the method may comprise storing data indicative of the identity of a plurality of different client devices in association with data indicative of one or more digital map update profiles to be used for each client device. The digital map update server may then obtain data indicative of an update profile to be used for the client device from the database.

As in the earlier aspects or embodiments of the invention, preferably each digital map update repository for updating a given baseline digital map in accordance with a particular update profile comprises full digital map data in respect of a version of the baseline map. In some embodiments the repository comprises full baseline digital map in respect of only a single version of the baseline map. The version of the baseline map in relation to which full digital map data is provided may be any given version of the digital map in relation to which an update journal is provided. The version is a version in relation to which a forward update journal is provided for updating to or from and/or in relation to which a reverse update journal is provided for updating to or from.

Preferably the digital map update repository comprises full baseline digital map data for a latest version of the map. The forward and reverse update journals may then provide sets of updates for updating the map between the version and one or more earlier versions. In some preferred embodiments the digital map update repository comprises full baseline digital map data for a latest version of the digital map, and at least a forward update journal for updating a successive previous version of the digital map to the latest version of the map. A complementary reverse journal is preferably provided.

In some preferred embodiments of the invention in any of its aspects or embodiments the digital map update server and the digital map update data repository system are located at a digital map update centre. The data of each digital map update data repository, and each journal thereof, is accessible to the digital map update server. The digital map update server may comprise at least a part of the digital map repository system. The server may comprise a set of one or more processors for carrying out the steps herein described.

As described above, in accordance with the invention in any of its aspects or embodiments, an incremental digital map update as used herein refers to an update that can be used to incrementally, i.e. partially, update an existing digital map of a client device, i.e. without replacement of the entire existing digital map. The update modifies the existing digital map. A set of incremental digital map update data refers to data indicative of a set of one or more such incremental digital map updates that can be used to incrementally update an existing digital map of a client device. Where the set of incremental digital map updates comprises data indicative of a plurality of incremental updates, the plurality of incremental updates of the set thus constitute, as a whole, data for only the partial or incremental updating of an existing digital map. The data indicative of the set of incremental digital map updates does not comprise an entire updated version of the digital map.

A set of incremental digital map updates of a digital map update journal provided for communication to a client device for updating a version of a baseline map from one version to another version may comprise one or more, and preferably a plurality of incremental digital map updates.

In accordance with the invention in any of its aspects, in embodiments data is communicated from one or more update journal of one or more digital map update repository to one or more remote client device. This may be achieved in any suitable manner. The step of communicating the data may comprise transmitting the data to the or each client device. The data may be transmitted to a client device through any suitable set of one or more transmitters. In preferred embodiments data from the or each digital map update repository is communicated to one or more client devices via a digital map update server. In embodiments, therefore the system further comprises a digital map update server in communication with the digital map data repository system, the digital map update server being arranged to be able to transmit data from the or each update journal of the or each digital map update repository to any one of a plurality of remote client devices of the system. The digital map update server is in communication with a plurality of remote client devices of the system. In accordance with any of the embodiments described in which data is communicated to one or more remote client devices from a digital map update journal or journals, or, from a digital map update repository or repositories, the data is preferably communicated to the client device or devices by a digital map update server that has access to the data of the journal(s) or update repository or repositories. The digital map update server may be arranged to receive data from a given one or ones of the client devices. For example, the server may receive the data from a client device or devices and use the data to retrieve data from the update repository system for communication to the device.

The incremental update data and/or full baseline map data of the digital map repository system in accordance with the invention in any of its aspects or embodiments may be obtained in any suitable manner, and may be received via a suitable data feed or feeds. The incremental update data may be received directly or indirectly from one or more digital map update centres. The digital map update centres may be associated with different entities, e.g. a baseline map producer and/or vehicle manufacturers or any other entities that may wish to update at least certain aspects of a baseline digital map.

In preferred embodiments at least the incremental update data of the or each update journal of the or each digital map update repository, and preferably full baseline digital map data of the or each repository, is received by the digital map repository system from a digital map compiler. The compiler may consolidate data from one or more data feeds, and/or convert the data to a standard digital map format before the data is provided to the digital map data repository system. The standard format may be the Navigation Data Standard (NDS) format.

The present invention may extend to the steps of providing a digital map update repository system in accordance with any of the embodiments of the invention. The method may extend to the step of providing a digital map forward and/or reverse update journal of a given digital map update repository. The step of creating a forward and/or reverse update journal is preferably conducted automatically.

The method may comprise receiving data indicative of a set of one or more incremental updates that can be used to update a given version of a baseline map to a later version, creating a digital map forward update journal comprising data indicative of the set of one or more incremental updates associated with a digital map update repository in respect of the baseline map, and preferably creating a digital map reverse update journal associated with the digital map update repository for the baseline map, the digital map reverse update journal comprising a set of one or more incremental updates that may be used to reverse the set of one or more incremental updates of the forward update journal in order to revert the digital map from the later version to the given version. The method may comprise determining a digital map update repository with which to associate the update journal, e.g. based upon an update profile associated with the repository.

In some embodiments the data is received from a compiler. The method may comprise adding received incremental update data received in a given period to the forward update journal, and preferably creating a reverse update journal for reversing the set of incremental update data of the forward update journal. The given period may be one day, or a given number of days, etc. The method may comprise using incremental update data relating to the baseline map received after the given period to create a new digital map forward update journal. The method may comprise associating data with the or each created forward and/or reverse journal indicative of the map version to which it relates. The data may be time data indicative of a time of creation of the map version. The incremental update data used to create the or each update journal may be received from any suitable data feed or feeds. It will be appreciated that the versions of the baseline map in respect of which forward or reverse update journals are provided in a given digital map update repository may be defined by the sets of incremental updates that are used to create the journal. Thus, if each journal comprises incremental update data in respect of updates received over a given time period, e.g. 1 day, each version will be in respect of intervals of that time period, e.g. daily intervals. Of course, the intervals may be selected as desired, and may be regular or irregular. The step of creating an update journal may comprise storing the set of incremental updates required to update a given version of the baseline map to another version in association with one another, and in association with the digital map update repository for the journal.

In accordance with a further aspect of the invention there is provided a method of providing a digital map data repository system in a digital map update system, the method comprising creating a digital map update repository comprising full digital map update data in respect of a baseline digital map according to an initial version of the map, receiving incremental update data relating to the baseline map, creating a digital map forward update journal associated with the digital map update repository comprising incremental update data received in relation to the baseline map in a given time period, wherein the incremental update data of the journal may be used to update the baseline map from the initial version to provide a new, later version, and creating a reverse update journal associated with the digital map update repository comprising a set of one or more incremental updates for reversing the set of one or more incremental updates of the forward update journal to revert the baseline digital map from the new, later version, back to the original version.

The method may further comprise creating one or more further digital map forward update journal associated with the digital map update repository comprising incremental update data received in relation to the baseline map in one or more further subsequent time periods, wherein the incremental update data of a forward journal may be used to update the baseline map from the version obtained using the full digital map data for the initial version of the digital map and the incremental update data of the or each forward update journal in respect of the or each previous given time period to provide one or more further new, later version, and creating a reverse update journal comprising a set of one or more incremental updates for reversing the set of one or more incremental updates of the or each further forward update journal to revert the baseline digital map from the or each new, later version, to the previous version. The digital map update repository created may be in accordance with a particular update profile. The incremental update data used to provide a journal associated with the repository is then for updating the baseline map in accordance with the update profile.

The method of the invention in any of its aspects or embodiments extends to the step of the client device implementing a received set of one or more incremental digital map updates. In these embodiments the set of one or more incremental digital map updates is provided from one or more update journals of a digital map update repository in accordance with any of the aspects or embodiments of the invention described above. The client device may comprise a digital map update management system for receiving and implementing received update data. This may comprise suitable client update module. The incremental update data is used to modify the existing digital map. The existing digital map of the device refers to the digital map of the device in its form prior to the relevant set of incremental updates being implemented. The client device is preferably arranged to use the received data indicative of a set of one or more incremental digital map updates to automatically incrementally update the existing digital map thereof.

The client device may or may not immediately update the existing map of the device using incremental digital map data provided from the digital map update repository system. Alternatively or additionally the method may comprise the client device storing data indicative of a set of one or more incremental map updates received from the digital map update repository system. This may allow updating of the existing map at a later time.

The client device may comprise a digital map update management system comprising means for receiving digital map incremental update data. The digital map update management system may additionally comprise means for causing the data to be implemented and/or means for storing received incremental update data. A device may implement the update without filtering of received update data. The digital map update management system is arranged to handle, e.g. receive, and cause to be implemented at least incremental digital map updates, and may additionally be arranged to handle other types of update, i.e. updates of the entire digital map, or entire regions (or tiles) thereof. The digital map update management system may be arranged to cause received incremental digital map update data (or other digital map data) to be stored. The digital map update management system may be arranged to cause such data to be stored in a digital map database of the client device. The data may be stored in such a manner to result in updating of existing digital map update data.

The digital map update management system may be arranged to communicate with a digital map update server in order to receive the data, e.g. from the or a digital map update repository. The communication is preferably two way. For example, the digital map update management system may be arranged to transmit data to a digital map update server, for example, to request update data for updating the existing digital map of the device to a given version and/or to specify an update profile for the data in certain embodiments. An update management system may comprise a suitable client update module.

It will be appreciated that a given digital map incremental update in accordance with the invention in any of its aspects or embodiments may be comprise one or more operations in relation to existing digital map data, e.g. in relation to the digital map data of the digital map to be modified. An operation may involve the addition, modification or deletion of existing digital map data. An update may be referred to as a transaction. Digital map incremental update data may comprise data indicative of one or more transactions to be performed in relation to existing digital map data. The one or more transactions may be in the NDS or otherwise standardised format for implementation in relation to digital map data according to the same standardized format.

As will be appreciated, in aspects or embodiments of the invention, the client devices, and the digital map update server comprise communication means for transmitting information to, and receiving information from, the other components of the system. The communication means can be of any type as desired. For example, the devices may comprise one or more physical connector interfaces by means of which data signals can be transmitted to and received from the device. In preferred embodiments, however, the communication means comprises one or more wireless transmitters/receivers to allow communication over cellular telecommunications and other signal and data networks, for example WiFi, GSM, GPRS and the like.

A digital map update journal as used herein, whether in relation to a forward or reverse journal, refers to a journal comprising data indicative of a set of one or more incremental updates that may be used to update a given version of a baseline map to another version thereof, in embodiments, in accordance with a given map update profile. The data indicative of the set of one or more incremental updates is used together with data indicative of the given version of the baseline map in updating the version of the baseline map to the another version thereof. The data indicative of the set of one or more incremental updates does not comprise full digital map data in respect of the another version of the map. The set of one or more incremental updates of a given update journal are indicative of a set of one or more operations that must be performed on the digital map data of a given version of the digital map in order to update that version of the digital map to another version, i.e. to update the digital map data for the version to provide digital map data for the another version.

A "digital map" as used herein in relation to the invention in any of its aspects or embodiments comprises data indicative of a plurality of navigable segments representing elements of a network of navigable elements in a geographical area covered by the map. For example, the plurality of navigable segments may be road segments representing roads of a road network in a geographical area covered by the map. The digital map may further comprise information concerning locations, such as Points of Interest (POI), e.g. in relation to their position on or relative to the network of navigable segments.

A "digital map update" as used herein in relation to the invention in any of its aspects or embodiments refers to any change to an existing digital map, e.g. baseline map version or existing digital map of a client device. An update may be a forward update i.e. to a newer version of the map, or a reverse update, i.e. to an earlier version of the map. Thus, an update may be a change in either direction to the digital map data indicative of an existing digital map. A given update may be for providing the modification, deletion, addition, correction, extension or enhancement of one or more features of the existing digital map when implemented. The update may be in relation to a segment or segments of the digital map and/or one or more attributes thereof. Thus an update may be in relation to the underlying structure of the digital map. Alternatively or additionally the update may be in relation to one or more features of the digital map, e.g. a data overlay layer, dynamic content associated with the map, the display of features of the map, etc. When implemented the update results in a modified version of the existing digital map, based upon the existing digital map. A given update may involve one or more changes to the digital map. The changes may be related changes. As described above, similar types of updates may be bundled together for providing a digital map data repository for updating a digital map in accordance with a given map update profile.

An "incremental digital map update" as used herein in relation to the invention in any of its aspects or embodiments refers to an update that can be used to incrementally, i.e. partially update an existing digital map, i.e. a given version of a baseline digital map or an existing digital map of a client device, i.e. without replacement of the entire digital map. The update modifies the existing digital map. A set of incremental digital map update data refers to data indicative of a set of one or more such incremental digital map updates that can be used to incrementally update an existing digital map. Where the set of incremental digital map updates comprises data indicative of a plurality of incremental updates, the plurality of incremental updates of the set thus constitute, as a whole, data for only the partial or incremental updating of an existing digital map. The data indicative of the set of incremental digital map updates does not comprise an entire updated version of the digital map.

A digital map update repository may, in accordance with the invention, be of any suitable construction, provided that it comprises the update journal or journals of the various aspects or embodiments of the invention. A given update repository is in respect of a particular baseline map, and, in embodiments, a particular update profile for the baseline map. Likewise, a digital map update journal may be of any suitable form, provided that the digital map incremental update for a given journal, for updating the baseline map from one version to another version, in embodiments in accordance with a given update profile, can be identified. Different digital map update journals may or may not be distinct. Similarly, update repositories for different baseline maps, or in respect of different update profiles for different baseline maps, where provided, may or may not be distinct from one another, provided that the data of each repository is somehow associated together. While in some embodiments, each digital map update repository may be a separate database from each other update repository, and/or each digital map update journal of a repository may be a separate database to each other journal of the repository, this is not necessarily the case. The data of the different repositories and/or journals may be stored as part of a common database or databases, with appropriate markers associated with the data to enable that data belonging to a given repository and/or journal to be identified. For example, it is envisaged that the one or more journals for a particular repository relating to a given baseline map may be provided as subdirectories of a master journal relating to all baseline maps. A given digital map data repository and/or a digital map update journal may comprise one or more database.

The system in any of its aspects or embodiments may comprise a digital map update server in communication with each one of a plurality of remote client devices for providing data indicative of a set of one or more digital map incremental updates thereto for use by the client devices in incrementally updating respective existing digital maps of the devices in accordance with any of the aspects or embodiments of the invention, the digital map update server being in communication with a digital map data repository system for obtaining the incremental update data.

Data indicative of a baseline map, or indeed a set of incremental updates, or any other subject matter referred to herein may be that data, or may be in any manner indicative thereof, for example, being a pointer to a location at which the data may be found.

The methods in accordance with the present invention in any of its aspects or embodiments may be implemented at least partially using software. It will thus be seen that, when viewed from further aspects, the present invention extends to a computer program product comprising computer readable instructions adapted to carry out any or all of the methods described herein when executed on suitable data processing means, such as a server.

The invention also extends to a computer software carrier comprising such software. Such a software carrier could be a physical (or non-transitory) storage medium or could be a signal such as an electronic signal over wires, an optical signal or a radio signal such as to a satellite or the like.

While the invention has been described herein by reference to matching requests for vehicles to available mobile vehicles for fulfilling the requests, it will be appreciated that the invention is applicable in its broader aspects at least to matching service requests to mobile service providers.

References to data being "associated" with other data, may refer to the data being in any manner associated therewith, e.g. using an appropriate pointer, etc.

It will also be understood by those skilled in the art that all of the described aspects and embodiments of the present invention can, and preferably do, include, as appropriate, any one or more or all of the preferred and optional features described herein.

BRIEF DESCRIPTION OF THE DRAWINGS

Various aspects of the teachings of the present invention, and arrangements embodying those teachings, will hereafter be described by way of illustrative example with reference to the accompanying drawings, of which.

DETAILED DESCRIPTION OF THE PREFERRED EMBODIMENTS

The features of an exemplary digital map update system for implementing incremental updates in relation to existing digital maps of client devices will first be described by way of background. The present invention will be described, by way of example only, in relation to a system in which digital map data is converted to a standard format, which is the Navigation Data Standard (NDS). It will be appreciated, however, that the same principles can be applied to any suitable run-time map format.

Figure 1:
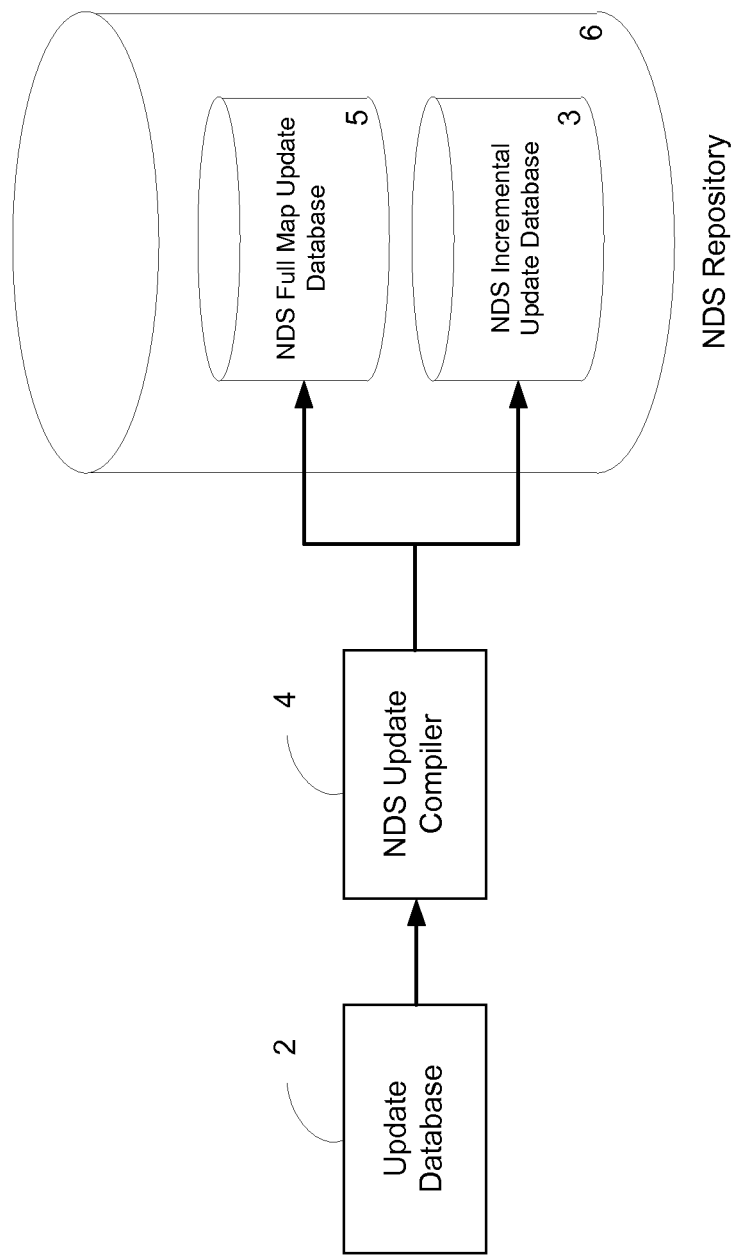
FIG. 1 illustrates an exemplary digital map update system for providing incremental update data for provision to client devices.

In FIG. 1, there is shown a digital map update database 2, which stores details of validated digital map updates. The validated map updates, e.g. transactions, may include all digital map updates made to the baseline or core digital map database, or a subset of such updates, e.g. in relation to only certain map attributes. The digital map updates may be received from one or more sources, and may be in accordance with different map formats. The digital map update database may comprise separate databases in relation to full map updates and incremental updates and/or in relation to data received from different sources.

An NDS update compiler 4 is used to translate the map updates received from the digital map update database 2 into changes to be performed on NDS objects, i.e. elements of a NDS map database. Thus the update compiler 4 converts map update data received from the database 2 to convert it into a standard format. In particular, the update complier reads current NDS objects, changes them according to the received map updates, and provides the data to the NDS data repository 6. The update compiler can operate an any frequency as needed, e.g. once or week or once a day. The NDS data repository 6 includes a digital map incremental update data repository 3 and a digital map full update data repository 5.

Update data received from the update compiler 4 is stored as part of the NDS repository 6, in association with the latest version of the NDS map database. The NDS repository 6 may store updates obtained from the update compiler 4 in a particular data feed as groups, i.e. as data layers. For example, where a data feed is provided at given intervals, e.g. daily, the updates received in a given feed for a particular time may be associated together as a group. It will be appreciated that the NDS repository 6 therefore stores baseline full map data and sets of incremental updates for particular times, which may be used together to provide an updated full map current for a particular time.

The map updates generated in the above described process are published, i.e. sent to client devices, via an update server using a suitable update protocol. An exemplary architecture of an NDS update platform for use in embodiments of the invention is shown in FIG. 2.

Figure 2:
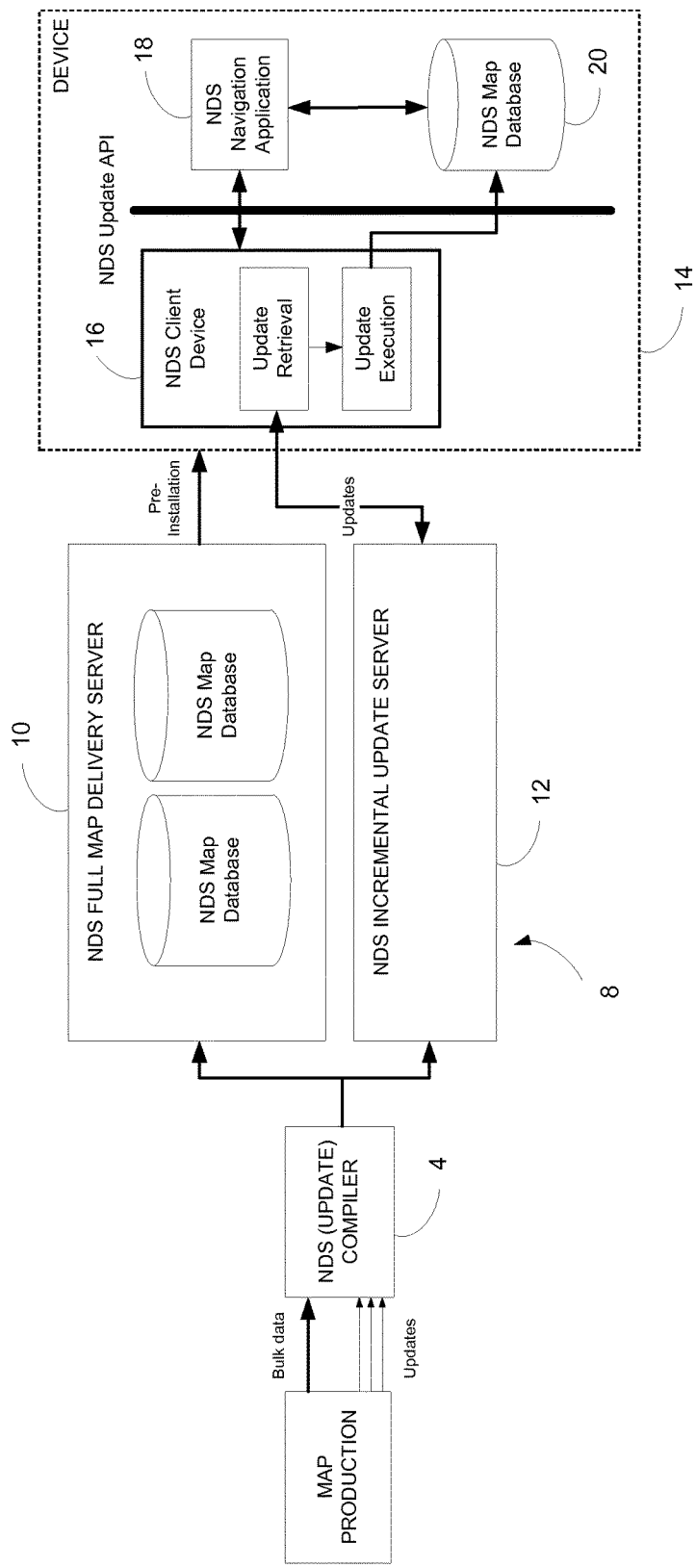
FIG. 2 illustrates an exemplary system for providing the data to the client devices.

As shown in FIG. 2, full maps and incremental updates are delivered to client devices 14 by means of a digital map update server system 8. The server system 8 includes an incremental update server 10 and a full map, i.e. baseline map, update server 12. The incremental update server 10 is in communication with the incremental update data repository 3 of the NDS data repository 6, and the full map update server 12 is in communication with the full map update data repository 5 for providing either full map data or incremental update data to the server. Updates from the full map update server 12 or the incremental map update server 12 are served by the update server 8 using an update client 16 on the client device 14. The update client 16 is in communication with a navigation application 18 and a digital map database 20 of the device 14 via an update API. This allows a client device, e.g. a portable navigation device (PND), mobile phone, in-dash navigation device, infotainment system, server, etc, to update the local run-time map to the latest version.

The system illustrated in FIGS. 1 and 2 may be referred to as a "transaction-based map system", in which full maps or incremental updates may be released to client devices on a continual basis.

The present invention, at least in preferred embodiments, relates to certain techniques which provide improved implementation of such incremental map update type systems.

The Applicant has realised that in systems such as that described by reference to FIGS. 1 and 2, in which updates in relation to a baseline map are received periodically, there can be challenges in ensuring that update data provided to client devices will result in a consistent version of the baseline map when implemented in relation to an existing digital map of the device. In contrast to systems in which the existing digital map of a device is completely replaced from time to time, ensuring quality and consistency of the client map in a system where the digital map of the device is only incrementally updated, such that only the map data in relation to changes in the map is updated, may present some difficulties.

The present invention in certain aspects seeks to provide a system for providing incremental update data for provision to client devices in a system such as that described by reference to FIGS. 1 and 2, and which may address some of these difficulties. An embodiment of a digital map update system in accordance with an embodiment of the invention will be described by reference to FIGS. 3 and 4.

Figure 3:
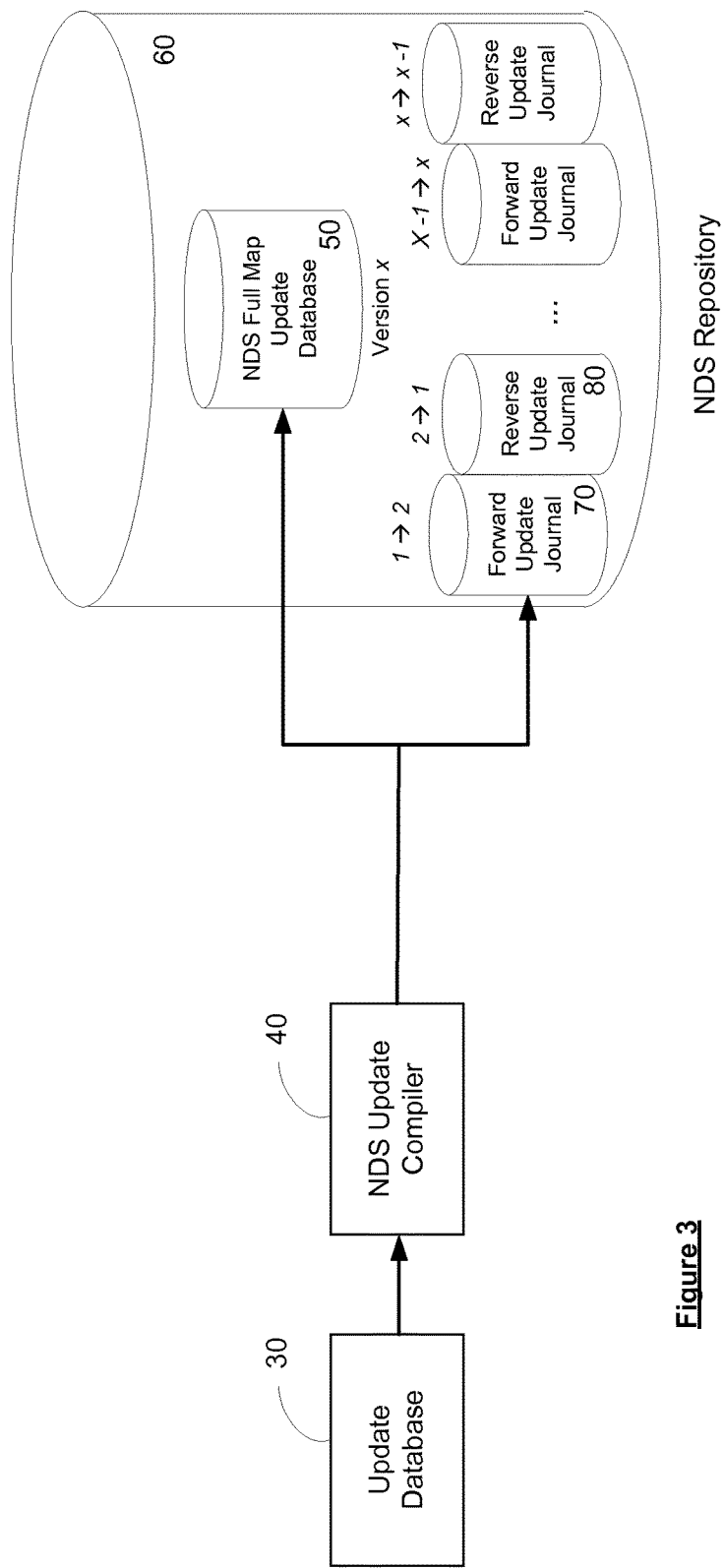
FIG. 3 illustrates a digital map update system comprising an NDS repository in accordance with an embodiment of the invention comprising forward and reverse update journals.

Referring now to FIG. 3, the system includes an update database 30 and an NDS update compiler 40 which are connected to an NDS repository 60 as in the system of FIG. 1. The update database 30 and NDS update compiler 40, their connection and interaction with one another, and with the NDS repository 60 may be as described in relation to FIG. 1. The modification in accordance with the invention is in relation to the NDS repository 60.

FIG. 3 illustrates schematically the structure of the NDS repository for one particular baseline map. The baseline map is a particular map product. A plurality of client devices of the system have an existing digital map that is a version of this baseline map. Although not shown in FIG. 3, multiple instances of the system shown in the Figure may be provided, each being in relation to a different one of a plurality of respective baseline maps.

It may be seen that as in the FIG. 1 embodiment, the NDS repository 60 includes an NDS full map update database 50. This database comprises digital map data in respect of the full map for a version, version x, of the baseline map. This is the latest available version of the digital map. In the embodiment of FIG. 3, a forward update journal 70 and a reverse update journal 80 is additionally provided. The forward update journal 70 is an automatically generated journal comprising a set of incremental updates that can be used to update the baseline map from version x−1 to version x. The reverse update journal 80 is an automatically generated journal comprising a set of incremental updates that can be used to revert the baseline map from version x back to version x−1.

For each version of the baseline digital map, a forward journal is provided in this way, including incremental update data for updating the version to the next successive version, and a complementary reverse update journal for reversing the updates and reverting the version of the map back to the previous version. Each forward update journal comprises incremental update data for updating a version of the digital map by one step, and its complementary reverse update journal comprises incremental update data for reversing the update by one step to revert to the previous map version.

The forward and reverse journals may be automatically generated by recording each incremental change received from the update compiler 40 and in respect of the data for a baseline map in a "forward journal" and the inverse change in a "reverse journal". This may be carried out, e.g. by a persistence framework, which may be functionality connected between the update compiler and the NDS repository. A "journal" is a recording of the data manipulations on the NDS map database which have happened within the incremental update process represented by the journal. The pairs of forward update journals and reverse update journals are stored as part of the NDS repository, in association with the full digital map data for a version of the baseline map, in this example, the most recent version.

A new forward update journal may be created whenever a group of updates are received from the update compiler 40 in the manner described by reference to FIG. 1. Thus, a new forward update journal may be created at given intervals, e.g. once a week, once a day, that may correspond to intervals at which update data is received via a data feed. Whenever a forward update journal is created, a complementary reverse update journal is also created.

The provision of an NDS repository in this manner, in respect of a given baseline map, allows a client device to update an existing digital map of the device, which corresponds to a version of the baseline map to the latest version, or indeed to any desired version, whether later or earlier than the existing version.

Figure 4:
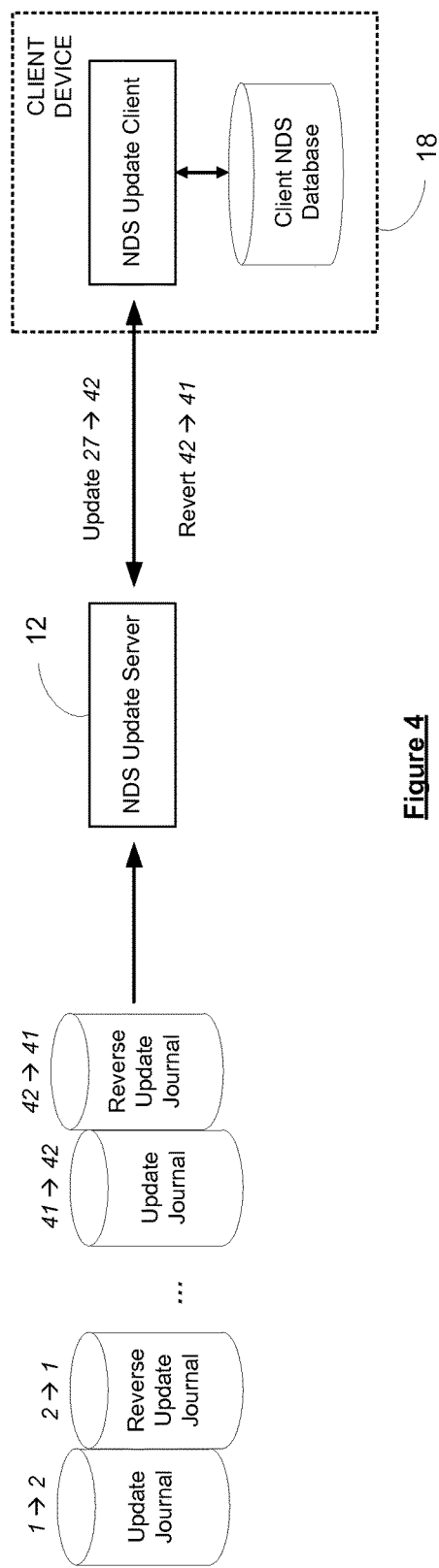
FIG. 4 illustrates the use of the system of FIG. 3 for providing update data to a client device.

FIG. 4 shows how the update journals, both forward and reverse, of the NDS repository for a given baseline map can be used to update the local digital map of a client device. Data may be delivered to the device by means of a digital map update server system as described by reference to FIG. 2, which is in communication with the forward and reverse journals of the NDS data repository 60.

In this example, the client device 14 has a local copy of the baseline map at version 27. It then requests, via the digital map update server system 10, an update to the latest possible version, which in this case is version 42. The incremental update sub server retrieves the incremental update data required from the relevant forward update journals, i.e. those comprising incremental update data for updating version 27 to 28, version 28 to 29, and so on, up to the forward update journal comprising the incremental update data for updating the map from version 41 to 42. The data is transmitted to the client device. The client device may then execute the update data and update its digital map to version 42. In preferred embodiments, the incremental update data from each forward update journal may be bundled into a single package for transmission to the client device.

Let us now assume that the client device 14 encounters a problem when the final update to version 42 is implemented. The client device submits a request, via the server system 10 to be provided with the set of incremental updates from the reverse journal of the NDS repository, for reverting version 42 of the map to version 41.

A suitable update protocol may be provided allowing retrieval of updates from a given version to any other version from the NDS repository via any suitable transport medium, e.g. WLAN, 3G, 4G, cable, SD card, USB stick, etc.

Before being made available to client devices, the full digital map data in respect of the latest version of the baseline map may be validated. Further validation may be performed in which NDS incremental map changes are validated against changes identified in the map production process used to maintain the update database 30.

In accordance with a further embodiment of the invention, the NDS repository structure of the embodiment of FIG. 3 for a given baseline digital map may be replicated in order to be able to provide update data in accordance with different update profiles. In these embodiments, an NDS repository is provided in respect of each of a plurality of different update profiles. Each NDS repository is of the structure described by reference to the repository 60 in FIG. 3, including full digital map data in respect of a version of the baseline map, and pairs of complementary forward and reverse update journals for transitioning between versions of the map. The incremental update data of the journals, and the latest version of the digital map in respect of which full digital map data is stored, is, however, in accordance with a particular update profile.

The Applicant has realised that different levels of incremental update will be appropriate for different client devices and/or users. For example, some client devices may be connected to the digital map update server continually for receiving updates, while others may only be occasionally connected to the server for receiving updates. Different client devices will have different abilities to handle incremental update information, e.g. depending upon processing power and/or storage capability. Furthermore, users may have different preferences as to which types of update are received and when, e.g. depending upon access to data services, personal preferences, etc.

Digital map updates may relate to a wide range of different aspects of a digital map. While some may relate to the core geometry of segments of a digital map, and may be considered to be "essential" updates, others may relate to "value added" type features, such as links to service providers associated with POI, 3D landmark data, etc.

The present invention in accordance with these further embodiments provides a system providing greater control over the provision of updates to client devices, allowing different types of update to be provided at different times and/or at different frequencies.

It will be appreciated that an incremental update will be stored in any NDS data repository associated with an update profile with which the incremental update is in accordance. Thus a given update may be stored in multiple repositories.

The incremental update sub server may then access a particular one of the NDS data repositories to obtain data in relation to incremental updates in accordance with a particular update profile, and may then serve the data to client devices in the manner described by reference to FIG. 2. By obtaining the data from a particular NDS data repository, it is possible to provide a bundle of incremental updates to a client device that will, when implemented, result in updating of a client device in accordance with the given update profile associated with that repository. This may reduce the need for post-filtering of update data by client devices, and allows update data tailored to the individual needs of a particular device and/or user to be served.

It will be appreciated that any number NDS repositories may be provided for a given baseline map, depending upon the number of different update profiles to be used. Additional data repositories may be added if it is desired to increase the number of update profiles in relation to which data may be served to client devices for a particular baseline map.

The update profiles may be selected as desired, and may be specified by users, or client device manufacturers, service providers, etc. The update profiles result in the respective NDS repositories for a particular baseline map comprising bundles of incremental updates in the different journals which can suitably be provided together to a client device. Thus the update profiles may impose requirements in relation to the type of update and/or the map feature to which it relates. In other arrangements, update profiles may impose requirements in relation to the levels of importance of updates to be included in a repository, e.g. core updates versus value added updates, or relating to basic updates (such as road segment geometry or attributes), or higher level updates (such as relating to the display of features or additional data layers). In other arrangements, the requirements may be in relation to the source of the map data, e.g. from a particular automotive manufacture, or the navigation system provider, etc.

As an illustration, at the extremes of the spectrum, one update profile may be chosen to provide an NDS repository comprising incremental update data which enables a client digital map to be maintained feature rich, and with high levels of value added data, i.e. incorporating all possible incremental updates. At the other end of the spectrum, an update profile may be chosen to result in an NDS repository including only incremental updates which are of an essential nature, relating to map patches which are essential to avoid replacement of the map.

In between these extremes, there may be any number of different update profiles which provide NDS repositories comprising incremental update data for updating different aspects of the digital map.

In one example with five digital map update profiles: Update profile 1—relates to dealership POI updates; Update profile 2—relates to partial updates of the digital map replacing portions of the map relating to individual countries and/or states, or individual content layers; Update profile 3—relates to sets of road attributes for particular geographic areas, e.g. corresponding to whole countries or all highways, etc; Update profile 4—relates to user centric updates, e.g. relating to a geographic area centred upon a user related location, e.g. current location, home location, or a corridor between a current location and selected destination; Update profile 5—relates to core updates regarding the geometry and/or connectivity of road segments.

The NDS repositories in respect of each update profile will comprise incremental update data for updating the baseline digital map in accordance with the relevant profile.

It will be appreciated that different ones of the NDS data repositories in accordance with different update profiles may be used by the digital map update server to serve different groups of client devices. As only selected incremental updates according to the relevant update profile are provided to devices, the need for post-filtering is reduced. As a separate NDS repository is maintained for each profile for a given baseline map, the likelihood of database inconsistencies is reduced.

The digital map update server 8, or specifically the incremental update sub server 12, may be arranged to serve data from different ones of the NDS data repositories to different client devices at different frequencies. For example, data from repositories associated with update profiles resulting in the repository including all types of update, or at least content rich updates, should be served more frequently than those associated with update profiles including only core updates. This may be achieved readily by setting the frequency with which the update server disseminates data from the different update repositories to client devices.

It will be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A digital map update system, comprising:
  at least one separate digital map update repository associated with each of one or more different baseline digital maps, each baseline digital map being a corresponding different given version of a digital map from among successive versions of the digital map, the or each digital map update repository comprising:
    one or more digital map forward update journals, each digital map forward update journal being in respect of a respective given version of the baseline map with which the digital map update repository is associated, wherein the or each digital map forward update journal comprises, for the respective given version of the baseline digital map, data indicative of a set of one or more incremental updates that may be used to update the respective given version of the baseline map to a later version; and
    one or more digital map reverse update journals, each digital map reverse update journal being in respect of a respective given version of the baseline map with which the digital map update repository is associated, wherein the or each digital map reverse update journal comprises, for the respective given version of the baseline digital map, data indicative of a set of one or more incremental updates that may be used to revert the respective given version of the baseline map to an earlier version,
    wherein a digital map reverse update journal is provided for each digital map forward update journal, the set of one or more incremental updates of the or each digital map reverse update journal being for reversing an effect of the or a digital map forward update journal; and
  a processor configured to, for each of one or more client devices:
    acquire, from the digital map update repository associated with a version of an existing baseline digital map of the client device, at least one digital map forward update journal and at least one digital map reverse update journal; and
    communicate, to the client device, the at least one digital map forward update journal and the at least one digital map reverse update journal for use by the client device in incrementally updating the existing baseline digital map of the client device.

2. The system of claim 1, wherein the one or more digital map forward update journals in each digital map update repository are provided in respect of different respective prior versions of the baseline digital map with which the digital map update repository is associated, wherein the prior versions of the baseline digital map are successive versions, and wherein each digital map forward update journal comprises, for the respective prior version of the baseline digital map, data indicative of a set of one or more incremental updates that may be used to update the respective prior version of the baseline digital map to a successive later version.

3. The system of claim 1, wherein the or each digital map update repository comprises digital map data for the given version of the baseline digital map and a forward update journal at least comprising incremental update data for updating a successive previous version of the baseline digital map to the given version of the baseline digital map.

4. The system of claim 3, wherein the or each digital map update repository comprises digital map data for at least a latest version of the baseline digital map with which the or each digital map update repository is associated.

5. The system of claim 1, wherein at least one of the one or more client devices is a navigation device.

6. The system of claim 5, wherein the navigation device is associated with a vehicle.

7. The system of claim 1, wherein the data in the at least one digital map forward update journal and the at least one digital map reverse update journal is of a standardized format.

8. A method of incrementally updating an existing digital map of a client device by a digital map update system, the digital map update system comprising:

at least one separate digital map update repository associated with each of one or more different baseline digital maps, each baseline digital map being a corresponding different given version of a digital map from among a sequence of versions of the digital map, the or each digital map update repository comprising:

one or more digital map forward update journals, each digital map forward update journal being in respect of a respective given version of the baseline map with which the digital map update repository is associated, wherein the or each digital map forward update journal comprises, for the respective given version of the baseline digital map, data indicative of a set of one or more incremental updates that may be used to update the respective given version of the baseline map to a later version; and one or more digital map reverse update journals, each digital map reverse update journal being in respect of a respective given version of the baseline map with which the digital map update repository is associated, wherein the or each digital map reverse update journal comprises, for the respective given version of the baseline digital map, data indicative of a set of one or more incremental updates that may be used to revert the respective given version of the baseline map to another earlier version, wherein a digital map reverse update journal is provided for each digital map forward update journal, the set of one or more incremental updates of the or each digital map reverse update journal being for reversing an effect of the or a digital map forward update journal;

the method comprising, for each of one or more client devices:

acquiring, from the digital map update repository associated with a version of an existing baseline digital map of the client device, at least one digital map forward update journal and at least one digital map reverse update journal; and communicating, to the client device, the at least one digital map forward update journal and the at least one digital map reverse update journal for use by the client device in incrementally updating the existing baseline digital map of the client device.

9. The method of claim 8, further comprising, receiving, from the client device, an indication of the version of the existing baseline digital map of the client device.

10. The method of claim 8, further comprising, by the client device, incrementally updating the existing baseline digital map of the client device based on one or more of the at least one digital map forward update journal and the at least one digital map reverse update journal.

11. The method of claim 10, wherein the client device uses data indicative of the version of a baseline digital map to which the at least one digital map forward update journal and the at least one digital map reverse update journal relate together with data indicative of a set of one or more incremental updates from the one or more of the at least one digital map forward update journal and the at least one digital map reverse update journal to update the existing baseline digital map of the client device.

12. The method of claim 8, wherein at least one of the one or more client devices is a navigation device.

13. The method of claim 12, wherein the navigation device is associated with a vehicle.

14. The method of claim 8, wherein the data in the at least one digital map forward update journal and the at least one digital map reverse update journal is of a standardized format.

15. A non-transitory computer readable medium comprising computer readable instructions that, when executed by one or more processors, cause the one or more processors to perform a method according to claim 8.

* * * * *